US008339426B2

(12) United States Patent
Kamada

(10) Patent No.: US 8,339,426 B2
(45) Date of Patent: Dec. 25, 2012

(54) ILLUMINATOR AND DISPLAY HAVING SAME

(75) Inventor: Kentaro Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 755 days.

(21) Appl. No.: 12/594,225

(22) PCT Filed: Mar. 28, 2008

(86) PCT No.: PCT/JP2008/056034
§ 371 (c)(1),
(2), (4) Date: Oct. 1, 2009

(87) PCT Pub. No.: WO2008/123403
PCT Pub. Date: Oct. 16, 2008

(65) Prior Publication Data
US 2010/0149225 A1   Jun. 17, 2010

(30) Foreign Application Priority Data

Apr. 2, 2007   (JP) ................................. 2007-096649

(51) Int. Cl.
  *G09G 5/10*  (2006.01)
(52) U.S. Cl. .......... 345/690; 345/74.1; 345/83; 345/102; 345/77; 345/88; 362/97.1; 349/69; 349/70
(58) Field of Classification Search .................. 345/690, 345/691, 74.1, 102, 77–76, 82–83, 88; 348/583; 348/602; 362/97.1–97.3; 349/64–65, 69–70
See application file for complete search history.

(56) References Cited

U.S. PATENT DOCUMENTS 7,629,988 B2 * 12/2009 Chung et al. .................. 345/694

(Continued)

FOREIGN PATENT DOCUMENTS

| JP | 2002-006317 A |   | 1/2002 |
|---|---|---|---|
| JP | 2003005179 A | * | 1/2003 |
| JP | 2003-271100 A |   | 9/2003 |
| JP | 2004-138827 A |   | 5/2004 |
| JP | 2004138827 A | * | 5/2004 |

(Continued)

OTHER PUBLICATIONS

Official Communication issued in International Patent Application No. PCT/JP2008/056034, mailed on Jun. 24, 2008.

*Primary Examiner* — Lun-Yi Lao
*Assistant Examiner* — Shaheda Abdin
(74) *Attorney, Agent, or Firm* — Keating & Bennett, LLP

(57) ABSTRACT

A display apparatus can perform a high quality moving picture display and provides improved color purity, and includes an illumination device that prevents and minimizes light unevenness in the form of a lamp image. The display apparatus includes an illumination device in which a first scattering layer, a first light-condensing layer, a second scattering layer, and a second light-condensing layer are arranged so as to cover a light-radiating surface of a light source unit including a first light source that emits light of a first color and a second light source that emits light of a second color complementary to the first color, a gate driver arranged to sequentially select each one of scanning lines at a cycle of 0.5 frames, a source driver that, at a first half of one frame time period, writes a data signal into each in a group of pixels of the first color, and at a latter half thereof, writes a data signal into each in groups of pixels of other two colors, and a switch circuit that, at the first half of one frame time period, switches on the first light source while switching off the second light source, and at the latter half of the time period, switches on the second light source while switching off the first light source.

19 Claims, 17 Drawing Sheets

U.S. PATENT DOCUMENTS

| | | |
|---|---|---|
| 2001/0050736 A1 | 12/2001 | Lee et al. |
| 2003/0174106 A1 | 9/2003 | Tanada et al. |
| 2004/0252255 A1 | 12/2004 | Folkerts |
| 2005/0140636 A1* | 6/2005 | Chung et al. .................. 345/98 |
| 2006/0215078 A1* | 9/2006 | Kawakami ..................... 349/95 |
| 2007/0229444 A1* | 10/2007 | Liu et al. ....................... 345/102 |

FOREIGN PATENT DOCUMENTS

| | | |
|---|---|---|
| JP | 2004-319122 A | 11/2004 |
| JP | 2004-341492 A | 12/2004 |
| JP | 2005-221619 A | 8/2005 |
| JP | 2006-267547 A | 10/2006 |

\* cited by examiner

ILLUMINATOR AND DISPLAY HAVING SAME

BACKGROUND OF THE INVENTION

1. Field of the Invention

The present invention relates to an illumination device used as a backlight of a display apparatus and to a display apparatus including the same. This invention particularly relates to an illumination device and a display apparatus that can provide improved color purity in a color display.

2. Description of the Related Art

In recent years, as a display apparatus for a television receiver or the like, liquid crystal display apparatuses characterized by, for example, being reduced in power consumption, thickness and weight have found widespread use. A liquid crystal display element per se does not emit light and thus is a so-called non-light-emitting type display element. Therefore, for example, on one principal surface of the liquid crystal display element, a plane light-emitting type illumination device (so-called backlight) is provided.

Backlights are classified roughly into a direct type and a sidelight (referred to also as "edge-light") type depending on an arrangement of a light source with respect to a liquid crystal display element. A direct type backlight has a configuration in which a light source is disposed on a rear surface side of a liquid crystal display element, and a diffusing plate, a prism sheet and the like are disposed between the light source and the liquid crystal display element so that uniform plane-shaped light is made incident on an entire rear surface of the liquid crystal display element. Such a direct type backlight has been used suitably in, for example, a large-screen liquid crystal display apparatus for a television receiver.

As a conventional light source for a backlight, a cold cathode fluorescent tube (CCFT) has been in common use. Further, with the recent advancement in development of a light-emitting diode (LED) having higher color reproducibility than a cold cathode fluorescent tube, a LED also has been used suitably as a light source for a backlight.

Furthermore, conventionally, a color display has been realized by color filters of three colors of RGB that are provided so as to correspond to pixels of a liquid crystal display element. FIG. 16 is a schematic diagram showing a structure of an active matrix substrate in a conventional active matrix type liquid crystal display element, in which each pixel is shown with a color of color filters corresponding thereto. As shown in FIG. 16, the active matrix substrate includes scanning lines GL and data lines DL that are arranged in a matrix form, a TFT 101 that is disposed at each of intersections of the scanning lines GL and the data lines DL, and a pixel electrode 102 that is connected to a drain electrode of the TFT 101. On an opposing substrate (not shown) opposed to this active matrix substrate, color filter layers of three colors of RGB are formed in stripes. Thus, as shown in FIG. 16, all of pixels in one column connected commonly to each of the data lines DL display one of the colors of RGB. For example, in FIG. 16, all of pixels connected to the data line DL1 display red (R).

In the active matrix type liquid crystal display element configured as above, when a gate pulse (selective voltage) is applied sequentially to the scanning lines GL1, GL2, GL3, GL4, . . . , each of the TFTs 101 connected to one of the scanning lines GL, to which the gate pulse has just been applied, is brought to an ON state, and a value of a gradation voltage that has been applied to a corresponding one of the data lines DL at that point in time is written into the each of the TFTs 101. Consequently, a potential of the pixel electrode 102 connected to a drain electrode of the each of the TFTs 101 becomes equal to the value of the gradation voltage of the corresponding one of the data lines DL. As a result of this, an orientation state of liquid crystals interposed between the pixel electrode 102 and an opposing electrode changes in accordance with the value of the gradation voltage, and thus a gradation display of the pixel is realized. On the other hand, during a time period in which a non-selective voltage is applied to the scanning lines GL, the TFTs 101 are brought to an OFF state, so that the potential of the pixel electrode 102 is maintained at a value of a potential applied thereto at the time of writing.

As described above, in the conventional liquid crystal display element, the color filters of three colors of RGB are arranged in an orderly manner, and while the scanning lines GL are selected sequentially in one frame time period, a gradation voltage of a desired value is applied to each of pixels that correspond to each of the colors of RGB from a corresponding one of the data lines DL, thereby realizing a color display.

As a CCFT used as a light source for a backlight of the above-described conventional liquid crystal display element that performs a color display, a three-wavelength tube or a four-wavelength tube is in general use. The three-wavelength tube is a fluorescent tube having wavelengths of red (R), green (G), and blue (B), and the four-wavelength tube is a fluorescent tube having wavelengths of red, green, blue, and deep red. In the case of the three-wavelength tube, red, green, and blue phosphors are sealed in the tube. In the case of the four-wavelength tube, red, green, blue, and deep red phosphors are sealed in the tube. In either of these cases, at the time of lighting, mixing of light of the respective wavelengths occurs, so that the liquid crystal display element is irradiated with the light that is light (white light) having an emission spectrum in all wavelength regions. Further, in the case where a LED is used as a light source for a backlight, a prism sheet, a diffusing plate and the like are used to mix the respective colors of light outputted from a red LED, a green LED, and a blue LED (a white LED further may be used) so as to form uniform white light, with which the liquid crystal display element then is irradiated.

The following describes a problem with the case where a light source having wavelength regions of the respective colors of red, green, and blue is used as a light source for a backlight.

FIG. 17 is a spectrum diagram showing spectral transmission characteristics of color filters of three colors of RGB. As shown in FIG. 17, the respective spectral transmission spectra of the blue color filter and the green color filter overlap in an area defined by a range of about 470 nm to 570 nm. Further, the respective spectral transmission spectra of the green color filter and the red color filter overlap in an area defined by a range of about 575 nm to 625 nm. Because of this, in the case of using a light source for a backlight having an emission spectrum in all wavelength regions, color mixing occurs in these areas in which the respective spectral transmission spectra overlap, resulting in deterioration in color purity, which has been disadvantageous.

For example, FIG. 18A shows an emission spectrum of a three-wavelength tube, FIG. 18B shows a spectral transmission characteristic of a red color filter in the case where this three-wavelength tube is used as a light source for a backlight, FIG. 18C shows a spectral transmission characteristic of a green color filter in the case where this three-wavelength tube is used as the light source for the backlight, and FIG. 18D shows a spectral transmission characteristic of a blue color filter in the case where this three-wavelength tube is used as the light source for the backlight.

As can be seen from FIG. 18C, a spectral transmission curve of the green color filter partially overlaps a wavelength region of blue. This means that a blue component is mixed into a pixel that is to be displayed in green. Further, as can be seen from FIG. 18D, a spectral transmission curve of the blue color filter also partially overlaps a wavelength region of green. This means that a green component is mixed into a pixel that is to be displayed in blue. Such a color mixing phenomenon occurs also in the case of using a four-wavelength tube as a light source for a backlight and has been a cause of deterioration in color purity.

Conventionally, in order to obtain improved color purity, a driving method (so-called field sequential driving) has been proposed in which LEDs of three colors of RGB are used as light sources for a backlight with respect to a liquid crystal display element including color filters of three colors of RGB, and the LEDs of the respective colors are caused to blink sequentially so that an image of red alone, an image of green alone, and an image of blue alone are displayed in order in one frame (see JP 2003-271100).

However, in the above-described configuration according to the conventional technique, when a frame rate is increased such as in the case where a moving picture display of a high-resolution image is performed, a problem arises that the field sequential driving in which a display is performed in such a manner that one frame is divided into three colors hardly can be performed. Particularly, in the case of a liquid crystal display apparatus, at least presently, a response speed of liquid crystals is not so high as to be sufficient, rendering it almost impossible to realize a high quality moving picture display by the field sequential driving.

SUMMARY OF THE INVENTION

With the foregoing in mind, preferred embodiments of the present invention provide a display apparatus that can perform a high quality moving picture display and provides improved color purity and an illumination device used in the display apparatus, such that light unevenness in the form of a lamp image less likely to be seen in an illumination device.

An illumination device according to a preferred embodiment of the present invention is preferably used as a backlight of a display apparatus and includes: a first light source that emits light of a first color; and a second light source that emits light of a second color complementary to the first color. In the device, the first light source and the second light source can be controlled so as to be switched on independently of each other, and a first scattering layer, a first light-condensing layer, a second scattering layer, and a second light-condensing layer are arranged sequentially from a side of a light source unit including the first light source and the second light source so as to cover a light-radiating surface of the light source unit.

Furthermore, a display apparatus according to a preferred embodiment of the present invention includes: a display element that includes scanning lines and data lines that are arranged in a matrix form; a switching element that is connected to each of the scanning lines and a corresponding one of the data lines; a pixel portion arranged to perform a gradation display in accordance with a data signal written from the corresponding one of the data lines when the switching element is brought to an ON state based on a signal of the each of the scanning lines; and color filters that are arranged so as to correspond to the pixel portions and include at least filters of three colors that exhibit a white color when mixed; an illumination device arranged to output plane-shaped light to the display element and includes a first light source that emits light of a first color that is one of the three colors and a second light source that emits light of a second color complementary to the first color, and in which a first scattering layer, a first light-condensing layer, a second scattering layer, and a second light-condensing layer are arranged sequentially from a side of a light source unit incorporating the first light source and the second light source toward the display element so as to cover a light-radiating surface of the light source unit; a scanning line driving portion arranged to sequentially supply a selection signal to each of the scanning lines at a cycle of half a time period in which one image is displayed in the display element; a data line driving portion that, at one of a first half and a latter half of the time period in which one image is displayed in the display element, supplies a data signal to be written into each in a group of pixel portions among the pixel portions that correspond to the color filter of the first color to a corresponding one of the data lines, and at an other of the first half and the latter half of the time period, supplies a data signal to be written into each in groups of pixel portions among the pixel portions that correspond respectively to the color filters of two colors among the three colors other than the first color to a corresponding one of the data lines; and a light source driving portion that, at the one of the first half and the latter half of the time period in which one image is displayed in the display element, switches on the first light source while switching off the second light source, and at the other of the first half and the latter half of the time period, switches on the second light source while switching off the first light source.

According to various preferred embodiments of the present invention, it is possible to provide a display apparatus that can perform a high quality moving picture display and provides improved color purity, and an illumination device used in the display apparatus. Particularly, in the illumination device, a first scattering layer, a first light-condensing layer, a second scattering layer, and a second light-condensing layer are arranged sequentially from a side of a light source unit including light sources in so as to cover a light-radiating surface of the light source unit, and thus light unevenness in the form of a lamp image, which is likely to be caused due to two types of light sources being arranged in line in a plane, is reduced effectively, thereby making it possible to realize a high quality moving picture display and further improved color purity.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 7C is a spectrum diagram showing a spectral characteristic of light that is transmitted through a pixel corresponding to a red color filter when the cold cathode florescent tubes 31RB are switched on, FIG. 7D is a spectrum diagram showing a spectral characteristic of light that is transmitted through a pixel corresponding to a green color filter when the cold cathode fluorescent tubes 31G are switched on, and FIG. 7E is a spectrum diagram showing a spectral characteristic of light that is transmitted through a pixel corresponding to a blue color filter when the cold cathode fluorescent tubes 31RB are switched on.

DETAILED DESCRIPTION OF THE PREFERRED EMBODIMENTS

Figure 1:
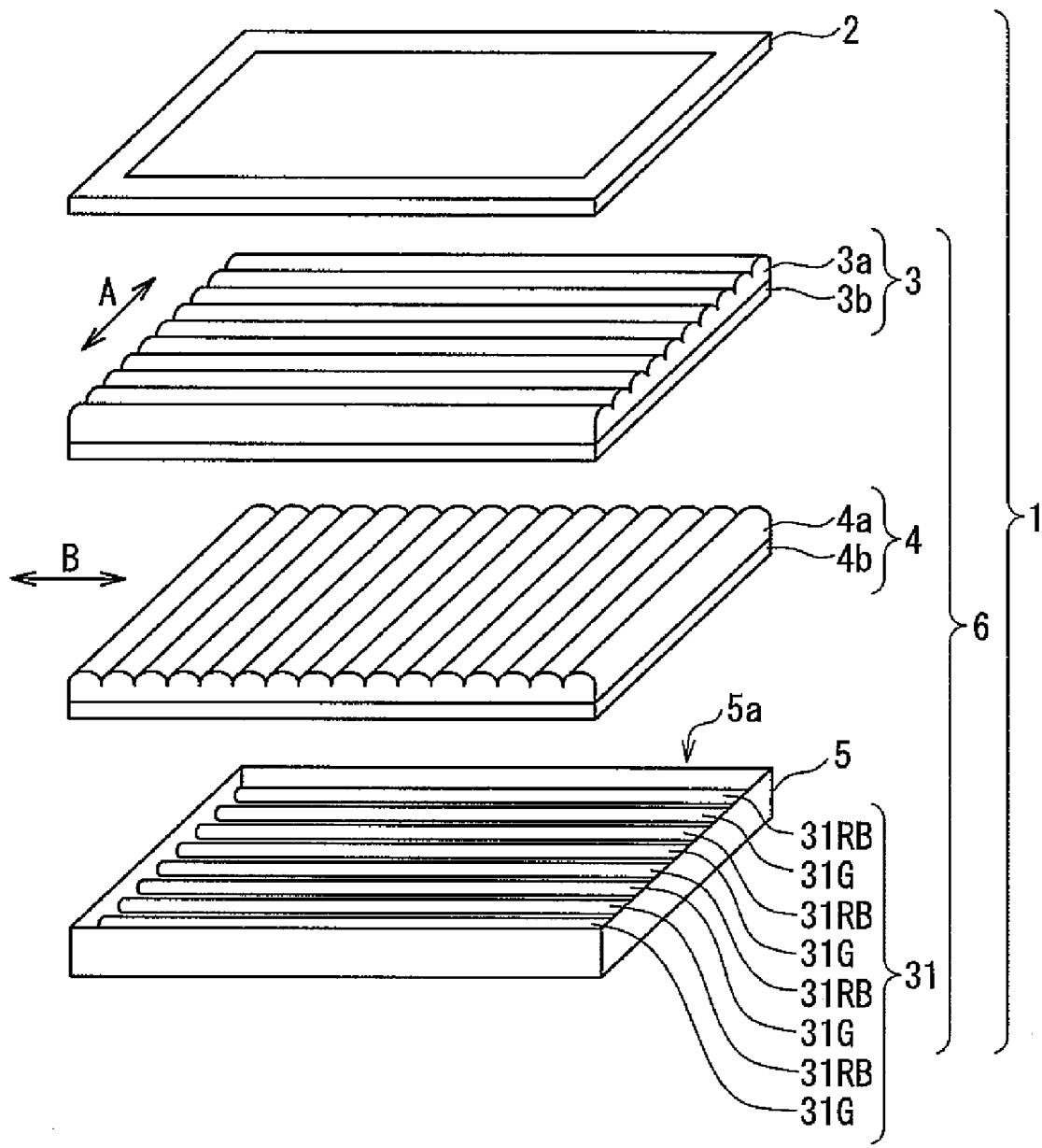
FIG. 1 is a an exploded perspective view showing a schematic configuration of a liquid crystal display apparatus according to one preferred embodiment of the present invention.

An illumination device according to the present invention is an illumination device that is preferably used as a backlight of a display apparatus and includes: a first light source that emits light of a first color; and a second light source that emits light of a second color complementary to the first color. In the device, the first light source and the second light source can be controlled so as to be switched on independently of each other, and a first scattering layer, a first light-condensing layer, a second scattering layer, and a second light-condensing layer are arranged sequentially from a side of a light source unit incorporating the first light source and the second light source so as to cover a light-radiating surface of the light source unit.

Preferably, in the above-described illumination device, the first light-condensing layer and the second light-condensing layer are defined by a lens sheet with a light output side surface on which a plurality of unit lenses are arranged, for example. The shape and arrangement pitch of the unit lenses are adjusted so as to be appropriate, thus making it possible to effectively condense light from a light source that has been scattered at a scattering layer.

Furthermore, preferably, the lens sheet has a lens portion in which a multitude of column-shaped lens structures are arranged in line in a direction that is perpendicular or substantially perpendicular to an axis of each of the lens structures in such a manner that the axis is parallel or substantially parallel to a sheet surface. This configuration is preferable in that it allows easy realization of a lens sheet on which a group of unit lenses having a light-condensing action in an arrangement direction of lens structures are formed.

Moreover, preferably, the lens sheet is a lenticular sheet having a lens portion in which a multitude of semi-columnar convex cylindrical lenses are arranged in line in a direction perpendicular or substantially perpendicular to an axis of each of the lenses in such a manner that the axis is parallel or substantially parallel to a sheet surface. This configuration is preferable in that the use of a lenticular sheet having an excellent light-condensing characteristic allows easy realization of a lens sheet having a high light-condensing ability.

Furthermore, more preferably, the first light-condensing layer and the second light-condensing layer are disposed in such a manner that arrangement directions of the lens structures formed respectively on the light output side surfaces of the first light-condensing layer and the second light-condensing layer are perpendicular or substantially perpendicular to each other. This configuration can provide a backlight that can realize a high-contrast displayed image.

Furthermore, preferably, in the above-described illumination device, as each of a combination of the first scattering layer and the first light-condensing layer and a combination of the second scattering layer and the second light-condensing layer, an optical sheet is used that is obtained by forming a lens sheet with a light output side surface on which a plurality of unit lenses are arranged and a light-scattering sheet into one body via an adhesive layer. According to this configuration, layers having four optical functions, respectively, can be laminated reliably and easily, thereby allowing an illumination device to be obtained that is excellent also from the viewpoints of manufacturing cost reduction and product management.

Moreover, preferably, in the optical sheet, a light-reflecting layer is provided between the lens sheet and the light-scattering sheet, a surface of which on a side of the light-scattering sheet has high light reflectivity, and in the light-reflecting layer, an opening is formed in a portion corresponding to a portion of a flat surface of the lens sheet, onto which a perpendicular line from a vertex of a convex portion of each of the unit lenses is dropped, so as to correspond to the each of the unit lenses of the lens sheet. According to this configuration, only light whose scattering angle is narrowed is incident on each of lenses, and thus no light is incident obliquely on the lenses, thereby making it possible to eliminate light that is outputted uselessly in a lateral direction without traveling in a user visual angle direction.

In addition, preferably, the lens sheet has a lens portion in which a multitude of column-shaped lens structures are arranged in line in a direction that is perpendicular or substantially perpendicular to an axis of each of the lens structures in such a manner that the axis is parallel or substantially parallel to a sheet surface. Further, preferably, the lens sheet is a lenticular sheet having a lens portion in which a multitude of semi-columnar convex cylindrical lenses are arranged in line in a direction perpendicular or substantially perpendicular to an axis of each of the lenses in such a manner that the axis is parallel or substantially parallel to a sheet surface. Moreover, a first optical sheet that is the optical sheet as the combination of the first scattering layer and the first light-condensing layer and a second optical sheet that is the optical sheet as the combination of the second scattering layer and the second light-condensing layer are laminated in such a manner that arrangement directions of the lens structures formed respectively on light output side surfaces of the first optical sheet and the second optical sheet are perpendicular or substantially perpendicular to each other. According to this configuration, even in the case of using an optical sheet obtained by forming a lens sheet and a light-scattering sheet into one body via an adhesive layer, unit lenses thereof can be realized easily, and a backlight that can provide a high-contrast displayed image further can be realized.

Furthermore, preferably, in the above-described illumination device, the light of the first color has a spectrum principally in a wavelength region of green, and the light of the second color has a spectrum principally in wavelength regions of red and blue. Alternatively, it is also preferable that in the above-described illumination device, the light of the first color has a spectrum principally in a wavelength region of blue, and the light of the second color has a spectrum principally in wavelength regions of red and green.

Furthermore, preferably, in the above-described illumination device, each of the first light source and the second light source is a cold cathode fluorescent tube or a hot cathode fluorescent tube. Moreover, preferably, a plurality of the first light sources and a plurality of the second light sources are provided and arranged so as to alternate with each other one by one or in sets of a plural number of the first or second light sources.

Furthermore, preferably, in the above-described illumination device, the first light source is a green light-emitting diode, and the second light source is formed of a combination of a red light-emitting diode and a blue light-emitting diode that emits light at a same time that the red light-emitting diode emits light. Alternatively, preferably, in the above-described illumination device, the first light source is a blue light-emitting diode, and the second light source is formed of a combination of a red light-emitting diode and a green light-emitting diode that emits light at a same time that the red light-emitting diode emits light.

Furthermore, a display apparatus according to a preferred embodiment of the present invention has a configuration including: a display element that includes: scanning lines and data lines that are arranged in a matrix form; a switching element that is connected to each of the scanning lines and a corresponding one of the data lines; a pixel portion arranged to perform a gradation display in accordance with a data signal written from the corresponding one of the data lines when the switching element is brought to an ON state based on a signal of the each of the scanning lines; and color filters that are arranged so as to correspond to the pixel portions and include at least filters of three colors that exhibit a white color when mixed; an illumination device arranged to output plane-shaped light to the display element and includes a first light source that emits light of a first color that is one of the three colors and a second light source that emits light of a second color complementary to the first color, and in which a first scattering layer, a first light-condensing layer, a second scattering layer, and a second light-condensing layer are arranged sequentially from a side of a light source unit incorporating the first light source and the second light source toward the display element so as to cover a light-radiating surface of the light source unit; a scanning line driving portion arranged to sequentially supply a selection signal to each of the scanning lines at a cycle of half a time period in which one image is displayed in the display element; a data line driving portion that, at one of a first half and a latter half of the time period in which one image is displayed in the display element, supplies a data signal to be written into each in a group of pixel portions among the pixel portions that corresponds to the color filter of the first color to a corresponding one of the data lines, and at an other of the first half and the latter half of the time period, supplies a data signal to be written into each in groups of pixel portions among the pixel portions that correspond respectively to the color filters of two colors among the three colors other than the first color to a corresponding one of the data lines; and a light source driving portion that, at the one of the first half and the latter half of the time period in which one image is displayed in the display element, switches on the first light source while switching off the second light source, and at the other of the first half and the latter half of the time period, switches on the second light source while switching off the first light source.

Herein, "... exhibit a white color when mixed" refers to a state of being seen to be white and nearly white to the human eye, which does not necessarily have to be a state of exhibiting perfect white by chromatic definition.

According to this configuration, at one of a first half and a latter half of a time period in which one image is displayed in the display element, a data signal to be written into each in a group of pixel portions among the pixel portions that corresponds to the color filter of the first color is supplied to a corresponding one of the data lines, and at an other of the first half and the latter half of the time period, a data signal to be written into each in groups of pixel portions among the pixel portions that correspond respectively to the color filters of two colors among the three colors other than the first color is supplied to a corresponding one of the data lines. Further, at the one of the first half and the latter half of the time period in which one image is displayed in the display element, the first light source is switched on while the second light source is switched off, and at the other of the first half and the latter half of the time period, the second light source is switched on while the first light source is switched off. Thus, even in the case where a spectral transmission curve of any one of color filters of the respective colors overlaps a wavelength region of another color, deterioration in color purity can be prevented.

Furthermore, more preferably, in the display apparatus having the above-described configuration, the illumination device adopts any one of the above-described preferred modes of the illumination device according to a preferred embodiment of the present invention, particularly in a portion related to the first scattering layer, the first light-condensing layer, the second scattering layer, and the second light-condensing layer. The reason for this is that this configuration can effectively reduce the occurrence of light unevenness in the form of a lamp image in the display apparatus of a preferred embodiment of the present invention in which the first light source and the second light source are arranged in line.

Moreover, preferably, in the display apparatus having the above-described configuration, at one of the first half and the latter half of the time period in which one image is displayed in the display element, the data line driving portion supplies a data signal for causing each in the groups of pixel portions among the pixel portions that correspond respectively to the color filters of two colors among the three colors other than the first color to perform a black gradation display to a corresponding one of the data lines, and at an other of the first half and the latter half of the time period in which one image is displayed in the display element, the data line driving portion supplies a data signal for causing each in the group of pixel portions among the pixel portions that corresponds to the color filter of the first color to perform a black gradation display to a corresponding one of the data lines.

This is preferable in that at each of a first half and a latter half of a time period in which one image is displayed in the display element, a pixel portion of a color that is not to be displayed is set so as to perform a black gradation display, and thus the generation of leakage light is prevented, thereby allowing further improved color purity to be obtained.

Furthermore, preferably, in the above-described configuration, in the illumination device, a plurality of the first light sources and a plurality of the second light sources are arranged in a direction that is perpendicular or substantially perpendicular to the scanning lines, and at one of the first half and the latter half of the time period in which one image is displayed in the display element, the light source driving portion switches on the plurality of the first light sources successively in an order of arrangement so as to be synchronized with an application of the selection signal to each of the scanning lines, and at another of the first half and the latter half of the time period in which one image is displayed in the display element, the light source driving portion switches on the plurality of the second light sources successively in an order of arrangement so as to be synchronized with the application of the selection signal to each of the scanning lines.

This configuration is preferable in that with respect to the first light source and the second light source that are arranged in close proximity to each other, it prevents light from the first light source from being mixed with light from the second light source, thereby allowing further improved color purity to be obtained.

Furthermore, preferably, in the above-described configuration, an interpolation data generating portion further is provided and arranged to generate a data signal to be supplied to one of the data lines at the latter half of the time period in which one image is displayed in the display element by performing interpolation between a data signal to be supplied to the one of the data lines in the time period and a data signal to be supplied to the one of the data lines in a time period subsequent to the time period. This configuration is preferable in that, particularly, in the case where a moving picture is displayed, the occurrence of a color breaking phenomenon can be prevented.

Furthermore, preferably, in the above-described configuration, the light of the first color has a spectrum principally in a wavelength region of green, and the light of the second color has a spectrum principally in wavelength regions of red and blue. Alternatively, it is also preferable that in the above-described configuration, the light of the first color has a spectrum principally in a wavelength region of blue, and the light of the second color has a spectrum principally in wavelength regions of red and green.

Furthermore, preferably, in the above-described configuration, each of the first light source and the second light source is a cold cathode fluorescent tube or a hot cathode fluorescent tube. Moreover, preferably, in this configuration, a plurality of the first light sources and a plurality of the second light sources are provided and arranged so as to alternate with each other one by one or in sets of a plural number of the first or second light sources.

Furthermore, the above-described configuration may be such that the first light source is a green light-emitting diode, and the second light source is formed of a combination of a red light-emitting diode and a blue light-emitting diode that emits light at a same time that the red light-emitting diode emits light. Alternatively, the above-described configuration also may be such that the first light source is a blue light-emitting diode, and the second light source is formed of a combination of a red light-emitting diode and a green light-emitting diode that emits light at a same time that the red light-emitting diode emits light.

Hereinafter, the illumination device and the display apparatus according to the present invention will be described by way of preferred embodiments with reference to the appended drawings. While being directed to an exemplary case where a television receiver including a transmission type liquid crystal display element is used as the display apparatus according to the present invention, the following description is not intended to limit an application scope of the present invention. As the display element according to the present invention, for example, a semi-transmission type liquid crystal display element can be used. Further, the applications of the display apparatus according to the present invention are not limited only to a television receiver.

First Preferred Embodiment

FIG. 1 is a schematic diagram illustrating an illumination device and a liquid crystal display apparatus according to one preferred embodiment of the present invention. As shown in FIG. 1, a liquid crystal display apparatus 1 according to this preferred embodiment includes a liquid crystal panel 2 that is a display element and a backlight device 6 that is an illumination device for allowing an image to be displayed on the liquid crystal panel 2. The backlight device 6 includes a light source unit 5 incorporating a plural number of cold cathode fluorescent tubes 31, a second optical sheet 4 arranged between the light source unit 5 and the liquid crystal panel 2 in so as to cover a light-radiating surface 5a of the light source unit 5, and a first optical sheet 3 laminated on the second optical sheet 4.

In the preferred embodiment shown in FIG. 1, as the cold cathode fluorescent tubes 31 included in the light source unit 5, for example, a green cold cathode fluorescent tube 31G as a first light source that emits first light having a green color and, for example, a magenta cold cathode fluorescent tube 31RB as a second light source that emits second light having a magenta color (red color+blue color) complementary to the green color, are arranged so as to alternate with each other. Therefore, the green light that is the first light and the magenta light that is the second light, which are emitted from the light-radiating surface 5a of the light source unit 5 toward the liquid crystal panel 2, sequentially transmit through the second optical sheet 4 and the first optical sheet 3 to be incident on the liquid crystal panel 2.

The first optical sheet 3 and the second optical sheet 4 are both obtained preferably by laminating light-scattering sheets 3b and 4b on lens sheets 3a and 4a, respectively, so that they are integrated. In both of the first optical sheet 3 and the second optical sheet 4, the light-scattering sheets 3b and 4b are provided on a side of the light source unit 5, and the lens sheets 3a and 4a are provided on a side of the liquid crystal panel 2. Therefore, from the viewpoint of an action with respect to the first light and the second light emitted from the light source unit 5, the following configuration is provided. That is, the light-scattering sheet 4b, which is a first scattering layer that scatters the first light and the second light, the lens sheet 4a, which is a first light-condensing layer that condenses these lights, the light-scattering sheet 3b, which is a second scattering layer that scatters again the lights that have transmitted through the lens sheet 4a as the first light-condensing layer, and the lens sheet 3a, which is a second light-condensing layer that further condenses these lights, are laminated sequentially.

In the following description of optical sheets or the like used in the present invention, where appropriate, relative to a traveling direction of the first light and the second light emitted from the light source unit 5, the side of the light source unit 5 is expressed as a light incidence side, and the side of the liquid crystal panel 2 is expressed as a light output side. Using these expressions, it can be said that the first optical sheet 3 and the second optical sheet 4 are both arranged so that the light-scattering sheets 3b and 4b are disposed on the light incidence side, and the lens sheets 3a and 4b are disposed on the light output side.

Figure 2:
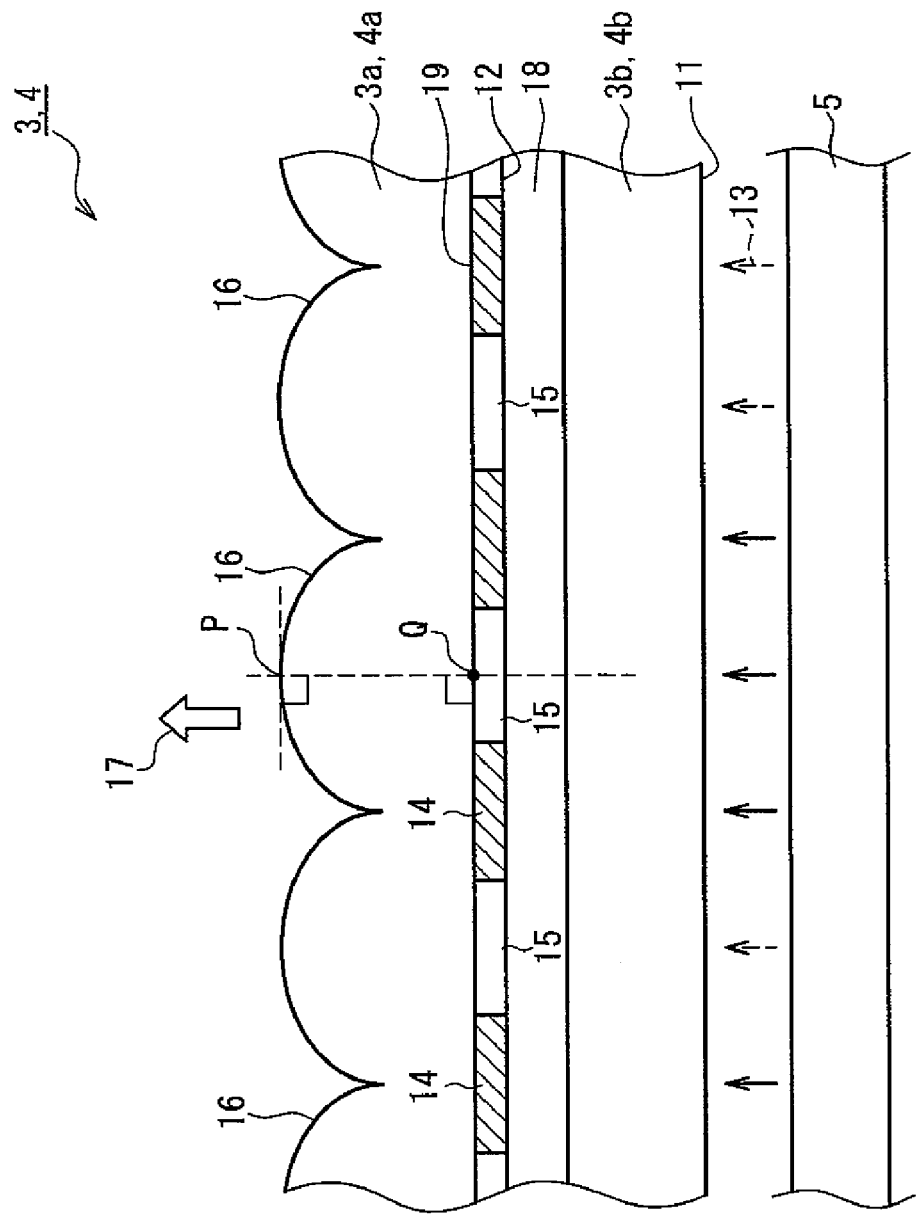
FIG. 2 is a partial cross-sectional view showing a configuration of an optical sheet used in a liquid crystal display apparatus according to the first preferred embodiment of the present invention.

Next, referring to FIG. 2, the following describes in detail the first and second optical sheets 3 and 4 used in this preferred embodiment. In this preferred embodiment, the first optical sheet 3 and the second optical sheet 4 are preferably formed using members of the same type, and therefore, in the following description, each of the first and second optical sheets 3 and 4 is referred to simply as an optical sheet and also is expressed by a reference character "optical sheet 3(4)".

FIG. 2 is a partial cross-sectional view in which part of the optical sheet 3(4) is enlarged. As shown in FIG. 2, the optical sheet 3(4) is obtained by forming the light-scattering sheet 3b(4b) and the lens sheet 3a(4a) into one body via an adhesive layer 18. The light-scattering sheet 3b(4b) has a function of scattering incident light 13 emitted by the light source unit 5, which has been incident from a light incidence surface 11 positioned on the light incidence side. The lens sheet 3a(4a) has a function of condensing light that has been scattered by the light-scattering sheet 3b(4b). In the lens sheet 3a(4a), a light-reflecting layer 12 that reflects light that has transmitted through the light-scattering sheet 3b(4b) is provided on a side of the light-scattering sheet 3b(4b).

Herein, on a light output side surface of the lens sheet 3a(4a), using PET (polyethylene terephthalate), PC (polycarbonate), PMMA (polymethyl methacrylate), COP (cycloolefin polymer) or the like, a plurality of unit lenses are formed preferably by extrusion molding, injection molding, hot press molding or the like. The lens sheet 3a(4a) of the optical sheet 3(4) according to this preferred embodiment is a lenticular sheet on which, as the unit lenses, a multitude of semi-columnar convex cylindrical lenses 16 having a height of about 50 µm are arranged in line at a pitch of 140 µm in a direction perpendicular or substantially perpendicular to a direction of an axis of the semi-columnar shape. This lenticular sheet preferably has a thickness of about 150 µm, for example.

The light-scattering sheet 3b(4b) used herein, for example, is configured of a light-transmitting resin such as a polystyrene resin, a PET film or the like containing resin beads or fine particles (filler) having a different refractive index or has either surface thereof matted, and preferably has a thickness of about 75 µm, for example. There has also been the case where, for convenience in handling the optical sheet 3(4), the light-scattering sheet 3b(4b) is configured of a diffusing plate having a thickness of about 2 mm so that the optical sheet 3(4) can secure a strength sufficient to be used in a backlight of a large-area liquid crystal display apparatus.

The lens sheet 3a(4a) and the light-scattering sheet 3b(4b) are fixed by the adhesive layer 18 that is formed of an adhesive substance such as an ultraviolet curable acrylic resin or the like and preferably has a thickness of about 50 µm, for example. In order that the incident light 13 has an improved light-scattering property, a diffusive material such as, for example, a spherical acrylic resin filler may be mixed into the adhesive layer 18.

As shown in FIG. 2, the light-reflecting layer 12 is composed of an opening 15 portion that is formed around a portion Q where a flat surface 19 of the lens sheet intersects with a perpendicular line dropped from a vertex P of a convex portion of each of the unit lenses formed on the lens sheet 3a(4a) onto the flat sheet 19 and a reflecting film 14 portion other than the opening 15 portion. Therefore, openings 15 are formed so as to be in one-to-one correspondence in number with the unit lenses that are formed. In the backlight device 6 according to this preferred embodiment, the light-reflecting layer 12 is set so that the area of the reflecting film 14 portion is equal to the area of the opening 15 portion, and a reflecting film preferably has a thickness of about 15 µm, for example.

A reflecting film 14 is formed preferably by coating, for example, white ink, a titanium dioxide-containing composite or the like and acts to reflect light from the light-scattering sheet 3b(4b) using its surface on a side of the light-scattering sheet 3b(4b) back to the light-scattering sheet 3b(4b). The reflecting film 14 patterned as described above can be formed by a printing method, a transfer method, a photolithography method, a self-alignment method in which lenses formed on a lens sheet are used as-is, or the like.

Furthermore, the openings 15 can be formed using hollow air layers as-is and also can be formed using a transparent resin. In the latter case, however, it is necessary to use a material having a refractive index lower than that of the lens sheet 3a(4a).

In the backlight device 6 according to this preferred embodiment, since the optical sheet 3(4) including the above-described light-reflecting layer 12 is used, only light whose scattering angle is narrowed as light to be incident on the lens sheet 3a(4a) is incident on each of the unit lenses, and thus no light is incident obliquely on the unit lenses, thereby making it possible to eliminate light that is outputted uselessly in a lateral direction without traveling in a user visual angle direction 17. Further, light whose scattering angle is inappropriate is reflected to a side of the light-scattering sheet 3b(4b) to be scattered and thus is made incident again on the lens sheet 3a(4a), thereby enabling efficient use of the incident light 13 from the light source unit 5.

As such a highly functional optical sheet, for example, "SAT (luminance enhancement sheet)" (product name) manufactured by TOPPAN PRINTING CO., LTD. is known.

Through the use of a highly functional optical sheet as described above, light unevenness in the form of a lamp image, which becomes likely to be caused when the fluorescent tubes 31G and 31RB of two colors are arranged sequentially in the light source unit 5, is reduced effectively, thereby making it possible to realize a high quality moving picture display and further improved color purity.

In the above-described highly functional optical sheet 3(4), the increase in width or thickness of the air layers as the openings 15 causes scattered light whose scattering angle is not narrowed sufficiently also to be incident on the lens sheet 3a(4a), resulting in an increased light component that is not outputted in the user visual angle direction 17. On the other hand, when the width or thickness of the air layers is decreased, only scattered light whose scattering angle is narrowed more evenly is incident on the lens sheet 3a(4a), so that while a light component effective for an image display increases, in some cases, light outputted from the optical sheet 3(4) has directionality stronger than necessary and thus may be recognized rather as light unevenness by a user. Therefore, the size of the openings 15 should be determined appropriately in accordance with an optical characteristic required of the optical sheet 3(4).

Furthermore, the light-reflecting layer 12 may be a layer with a predetermined thickness adhered firmly to the lens sheet 3a(4a) using an adhesive or the like or may be formed by forming the reflecting film 14 in a predetermined thickness on the back of the flat surface 19 of the lens sheet 3a(4a) so that the air layers as the openings 15 are formed effectively.

Although this preferred embodiment has described the case where a highly functional optical sheet is preferably used as a combination of a scattering layer and a light-condensing layer, the light source device and the display apparatus using the same according to the present invention are not limited thereto, and it also is possible to use as the first optical sheet and the second optical sheet, two optical sheets, each obtained by simply laminating a scattering sheet on a lens sheet and adhering them to each other so that they are integrated without including a light-reflecting layer. Further, needless to say, also in the case where four sheets that are the first scattering sheet, the first lens sheet, the second scattering sheet, and the second lens sheet are laminated sequentially from the side of the light source unit 5 to the side of the liquid crystal panel 2, the effect of reducing light unevenness in the form of a lamp image can be obtained.

Although the above description of the optical sheet has showed an example in which as the lens sheet, a lenticular sheet is used in which unit lenses formed on its light output side surface are semi-columnar convex cylindrical lenses, and a multitude of the convex cylindrical lenses are arranged in line in a direction perpendicular or substantially perpendicular to an axis of each of the lenses, the lens sheet as the light-condensing layer in the illumination device of the present invention is not limited thereto. Various types of lens sheets used conventionally in liquid crystal display apparatuses can be used, examples of which include a lens sheet such as a lenticular sheet, having a lens portion in which a multitude of column-shaped lens structures having a predetermined cross section are arranged in line in a direction perpendicular or substantially perpendicular to an axis of each of the lens structures in such a manner that the axis is parallel or substantially parallel to a sheet surface, i.e. in such a manner that column shapes are laid, and a lens sheet on which a multitude of segment-shaped microscopic convex lenses are arranged in line two-dimensionally.

As the lens sheet having a lens portion in which a multitude of column-shaped lens structures as unit lenses are arranged in line in a direction perpendicular or substantially perpendicular to an axis of each of the lens structures in such a manner that the axis is parallel or substantially parallel to a sheet surface, in addition to a lenticular sheet as described above, a lens sheet on which a multitude of triangular unit prisms that are column-shaped lens structures whose predetermined cross-sectional shape is a triangular shape are arranged is used often. Further, the predetermined cross-sectional shape of the column-shaped lens structures can be, in addition to a semicircular shape or a triangular shape, for example, a trapezoidal shape or a shape formed by combining a triangular shape or a trapezoidal shape with an arc. Moreover, the cylindrical lenses are not limited to the semi-columnar lenses whose predetermined lens cross-sectional shape is semicircular as shown in FIGS. 1 and 2 and also can be of a two-stage configuration in which on a vertex portion of a first lens having a columnar shape, a second columnar lens having a radius smaller than that of the first lens is laminated, in which case a light-condensing action of the lens sheet further can be enhanced.

The description is directed next to disposition directions of the two lens sheets.

In this preferred embodiment shown in FIG. 1, the first optical sheet 3 is disposed so that an arrangement direction of lenticular lenses formed on its surface (direction indicated by an arrow A in FIG. 1), namely, a direction perpendicular or substantially perpendicular to a direction of an axis in each of semi-columnar shapes forming the convex cylindrical lenses, is substantially parallel or substantially parallel to a perpendicular (vertical) or substantially perpendicular direction of a display screen of the liquid crystal panel 2. Further, the second optical sheet 4 is disposed so that an arrangement direction of the lenticular lenses formed on its surface (direction indicated by an arrow B in FIG. 1) is substantially parallel to a horizontal (lateral) direction of the display screen of the liquid crystal panel 2, i.e. so that the arrangement directions of the lenticular lenses formed on the two optical sheets, respectively, are perpendicular or substantially perpendicular to each other.

In the above-described case where as the lens sheet that is the light-condensing layer, a lens sheet is used that has a lens portion in which a multitude of column-shaped lens structures are arranged in line in a direction perpendicular or substantially perpendicular to an axis of each of the lens structures in such a manner that the axis is parallel or substantially parallel to a sheet surface, such as, for example, in the case where the lens sheet is a lenticular sheet or in the case where on the lens sheet, a multitude of column-shaped unit prisms whose cross section has a triangular shape or a trapezoidal shape are arranged in parallel, it is preferable that two light-condensing layers are disposed so that arrangement directions of column-shaped lens structures thereof (direction orthogonal to a direction of an axis in each of column shapes) are perpendicular or substantially perpendicular to each other.

The reason for the above is as follows. That is, in a lenticular sheet or a light-condensing layer having a lens portion in which a multitude of column-shaped unit prisms whose cross section has a triangular shape or a trapezoidal shape are arranged in parallel in a direction perpendicular or substantially perpendicular to an axis of each of the unit prisms, a light-condensing direction is limited to one direction that is the same as an arrangement direction of column-shaped lens structures. However, when two lens sheets are disposed so that arrangement directions of the lens structures formed on the light-condensing layers as the two lens sheets are perpendicular or substantially perpendicular to each other, light in each of two directions perpendicular or substantially perpendicular to each other such as a perpendicular direction and a horizontal direction can be condensed effectively, thereby allowing the contrast of a displayed image to be improved even further.

Herein, as for the expression that arrangement directions of lens structures formed on two lens sheets are arranged perpendicular to each other, what is intended by this expression is not limited to the state where the lens structures formed on the two lens sheets are completely perpendicular to each other, in other words, to the case where an angle formed by the arrangement directions of the lens structures is exactly 90 degrees. The reason for this is as follows. That is, although there is a case where an angle formed by the arrangement directions of the lens structures is not completely 90 degrees but deviates by several degrees due to an unavoidable manufacturing error caused when lens sheets are disposed, the effect of improving the contrast of a displayed image exhibited in this preferred embodiment is not reduced significantly by several degrees of deviation in the arrangement directions of the lens structures.

Moreover, the present invention does not exclude even the case where two lens sheets are disposed so that arrangement directions of lens structures formed thereon are parallel to each other, i.e. are in the same direction nor the case where the lens sheets are disposed so that the arrangement directions of the lens structures are not orthogonal to each other but intersect with each other at an angle of, for example, 30 degrees or 45 degrees. The reason for this is as follows. With the unique structure arrangement according to various preferred embodiments of the present invention, in which the first scattering layer, the first light-condensing layer, the second scattering layer, and the second light-condensing layer are laminated sequentially from the cold cathode fluorescent tubes 31 of the light source unit 5 as light sources for a backlight toward the display element, i.e. light radiated from the light sources for the backlight is subjected sequentially to a scattering action, a light-condensing action, a scattering action, and a light-condensing action, the effect of effectively reducing light unevenness in the form of a lamp image, which is likely to be caused due to two types of light sources for the backlight of colors complementary to each other, can be achieved at a level sufficient from the practical viewpoint.

Furthermore, in this preferred embodiment, the first lens sheet 3 is disposed so that the arrangement direction of the lenticular lenses is substantially parallel to the perpendicular direction of the display screen of the liquid crystal panel 2, and the second lens sheet 4 is disposed so that the arrangement direction of the lenticular lenses is substantially parallel to the horizontal direction of the display screen of the liquid crystal panel 2. This configuration is adopted in view of the following. That is, since the cold cathode fluorescent tubes 31 of the light source unit 5 are arranged in the perpendicular direction of the display screen of the liquid crystal panel 2 as shown in FIG. 1, when the arrangement direction of the lenticular lenses of the second lens sheet on a side closer to the cold cathode fluorescent tubes 31 is made perpendicular or substantially perpendicular to the arrangement direction of the cold cathode fluorescent tubes 31, light unevenness in the form of a lamp image can be eliminated more effectively. Further, also from the viewpoint of a viewing angle of a displayed image on the liquid crystal panel 2, it is advantageous to set the arrangement direction of the lenticular lenses in the first lens sheet on a side closer to the liquid crystal panel 2 to be the perpendicular direction. It is to be noted, however, that this configuration is used merely as one example and does not exclude the case where the first lens sheet 3 and the second lens sheet 4 are disposed in inverse directions to their directions in this configuration, respectively. Further, although it is preferable to dispose two lens sheets so that arrangement directions of lenticular lenses formed on their respective surfaces are precisely perpendicular to each other, the disposition directions of the two lens sheets are not necessarily limited thereto.

It is known that when an arrangement direction of lenticular lenses and an arrangement direction of pixels arranged in a matrix form in the liquid crystal panel 2 are made completely parallel to each other, an interference occurs between a boundary portion of the lenticular lenses and a light-blocking layer of the liquid crystal panel 2, which is commonly referred to as a black matrix, and causes moiré stripes to be seen conspicuously, resulting in the deterioration of an image quality. In order to prevent the occurrence of such moiré stripes, two lens sheets disposed so as to be perpendicular or substantially perpendicular to each other may be adhered firmly in a state where they are slightly rotated with respect to the liquid crystal panel 2.

Figure 3:
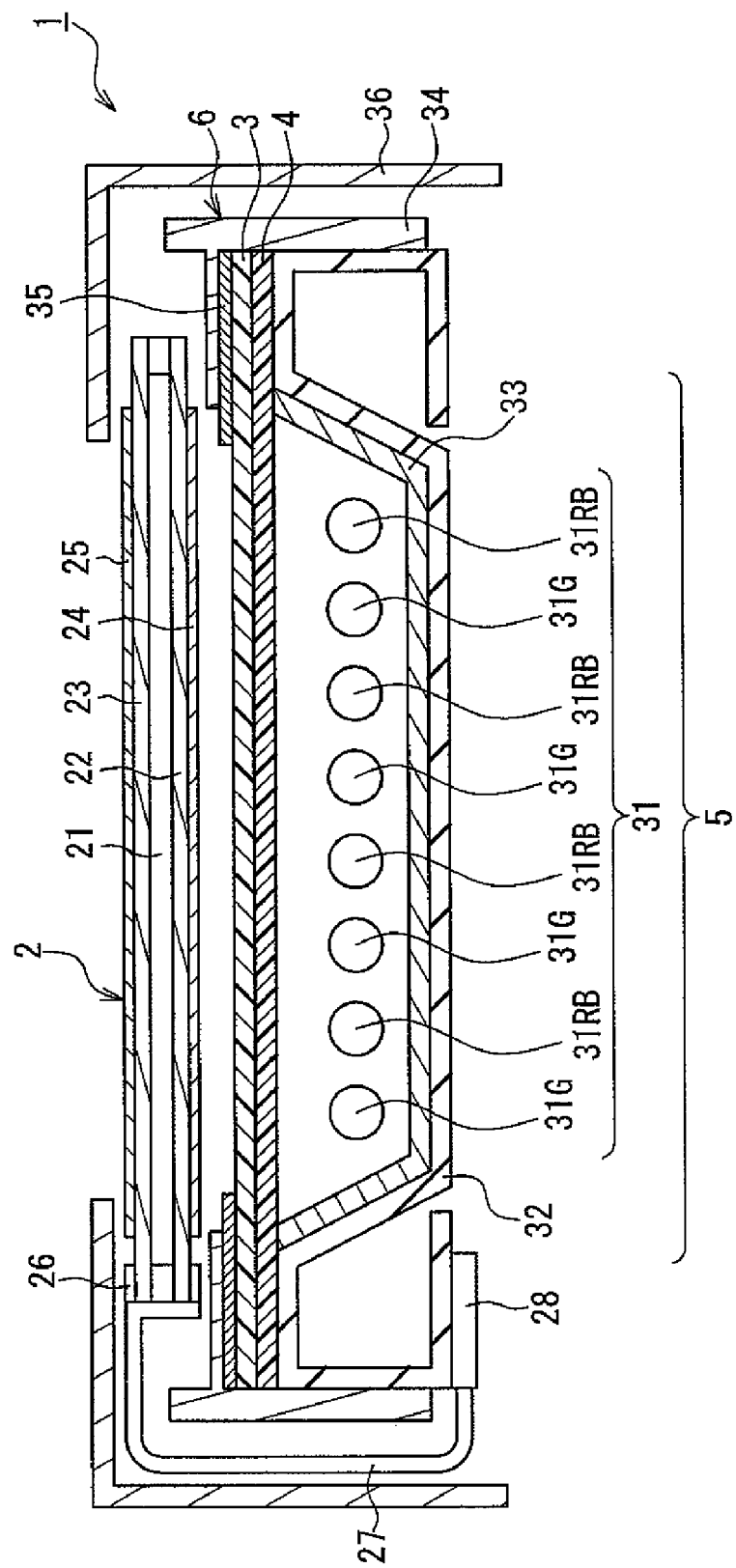
FIG. 3 is a cross-sectional view showing a schematic configuration of the liquid crystal display apparatus according to one preferred embodiment of the present invention.

Next, the following describes more specific configurations of the illumination device and the liquid crystal display apparatus including the same according to the first preferred embodiment of the present invention with reference to FIG. 3, which is a schematic cross-sectional view.

As shown in FIG. 3, in the liquid crystal display apparatus 1 according to this preferred embodiment, the liquid crystal panel 2 that is located with an upper side of FIG. 3 defined as a viewing side (display surface side) and the backlight device 6 that is disposed on a non-display surface side of the liquid crystal panel 2 (lower side of FIG. 3) and irradiates the liquid crystal panel 2 with plane-shaped light are provided.

The liquid crystal panel 2 includes a liquid crystal layer 21, a pair of transparent substrates 22 and 23 that sandwich the liquid crystal layer 21 therebetween, and polarizing plates 24 and 25 that are provided on respective outer surfaces of the transparent substrates 22 and 23, respectively. Further, in the liquid crystal panel 2, a driver 26 (a gate driver, a source driver or the like that will be described later) for driving the liquid crystal panel 2 is provided, and a drive circuit 28 that is connected to the driver 26 via a flexible printed board 27 is connected to the liquid crystal panel 2.

The liquid crystal panel 2 is an active matrix type liquid crystal panel and is configured so that supplying a scanning signal and a data signal respectively to scanning lines and data lines that are arranged in a matrix form allows the liquid crystal layer 21 to be driven on a pixel basis. Specifically, when a TFT (switching element) provided in the vicinity of each of intersections of the scanning lines and the data lines is brought to an ON state based on a signal of a corresponding one of the scanning lines, a data signal is written from a corresponding one of the data lines into a pixel electrode, and an alignment state of liquid crystal molecules changes in accordance with a potential level of the data signal, and thus each pixel performs a gradation display in accordance with a data signal. In other words, in the liquid crystal panel 2, a polarization state of light made incident from the backlight device 6 through the polarizing plate 24 is modulated by the liquid crystal layer 21, and an amount of light passing through the polarizing plate 23 is controlled, and thus a desired image is displayed.

In the backlight device 6, a bottomed case 32 that is open on a liquid crystal panel 2 side and a frame-shaped frame 34 that is located on a liquid crystal panel 2 side of the case 32 are provided. Further, the case 32 and the frame 34 are made of a metal or a synthetic resin and are held within a bezel 36 having an L shape in cross section with the liquid crystal panel 2 located above the frame 34. The backlight device 6 thus is combined with the liquid crystal panel 2, and the backlight device 6 and the liquid crystal panel 2 are integrated as the liquid crystal display apparatus 1 of a transmission type in which illumination light from the backlight device 6 is made incident on the liquid crystal panel 2.

Furthermore, the backlight device 6 includes the first optical sheet 3 arranged so as to cover an opening of the case 32, the second optical sheet 4, and a reflecting sheet 33 provided on an inner surface of the case 32. Further, in the backlight device 6, a plurality of the cold cathode fluorescent tubes 31 are provided above the reflecting sheet 33, and light from the cold cathode fluorescent tubes 31 is irradiated toward the liquid crystal panel 2 as plane-shaped light. Although FIG. 3 shows a configuration including eight cold cathode fluorescent tubes 31 for the sake of simplicity, the number of the cold cathode fluorescent tubes 31 is not limited thereto.

These plurality of cold cathode fluorescent tubes 31 include the cold cathode fluorescent tube 31G in which a green phosphor (for example, NP-108 manufactured by Nichia Corporation) is sealed so that an emission spectrum of the cold cathode fluorescent tube 31G has a peak in a wavelength region of green (for example, in the vicinity of 516 nm) and the cold cathode fluorescent tube 31RB in which red and blue phosphors (for example, NP-320 and NP-103 manufactured by Nichia Corporation) are sealed so that an emission spectrum of the cold cathode fluorescent tube 31RB has peaks in a wavelength region of red (for example, in the vicinity of 658 nm) and in a wavelength region of blue (for example, in the vicinity of 447 nm), respectively.

The cold cathode fluorescent tubes 31G and 31RB are arranged so that a longitudinal direction thereof is parallel or substantially parallel to an extending direction of the scanning lines of the liquid crystal panel 2. Although FIG. 3 shows an example in which the cold cathode fluorescent tubes 31G and the cold cathode fluorescent tubes 31RB are arranged so as to alternate with each other one by one, the cold cathode fluorescent tubes 31G and the cold cathode fluorescent tubes 31RB also may be arranged so as to alternate with each other in sets of a plural number (for example, two) of the cold cathode fluorescent tubes 31G or 31RB.

The number of the cold cathode fluorescent tubes 31 is determined appropriately in accordance with the screen size of the liquid crystal display apparatus 1, the brightness of each of the fluorescent tubes, and the like. In one example, in the case where the liquid crystal display apparatus 1 has a screen size of a so-called 37V type, it is preferable to have a configuration including about 18 cold cathode fluorescent tubes in total composed of nine cold cathode fluorescent tubes 31G and nine cold cathode fluorescent tubes 31RB.

The first optical sheet 3 and the second optical sheet 4 themselves have already been described in detail and thus the descriptions thereof are omitted herein. The four sides of the two optical sheets 3 and 4 are mounted on a frame-shaped surface provided on an upper side of the case 32, and the optical sheets 3 and 4 are incorporated in the backlight device 6 while being sandwiched between the surface of the case 32 and an inner surface of the frame 34 via a pressure member 35 that is deformable elastically.

The reflecting sheet 33 is formed of, for example, a thin film of a metal having a high light reflectance such as aluminum, silver or the like and functions as a reflecting plate that reflects light from the cold cathode fluorescent tubes 31 toward the optical sheets 3 and 4. Thus, in the backlight device 6, the use efficiency of light from the cold cathode fluorescent tubes 31 can be increased. In place of the above-described metal thin film, a reflecting sheet material made of a synthetic resin may be used, or alternatively, for example, a coating of a white paint or the like having a high light reflectance may be applied to the inner surface of the case 12 so that the inner surface functions as a reflecting plate. The reflecting sheet 33, the cold cathode fluorescent tubes 31, and the case 32 constitute the light source unit 5. Further, the opening of the case 32 corresponds to the light-radiating surface 5a of the light source unit 5.

Figure 4:
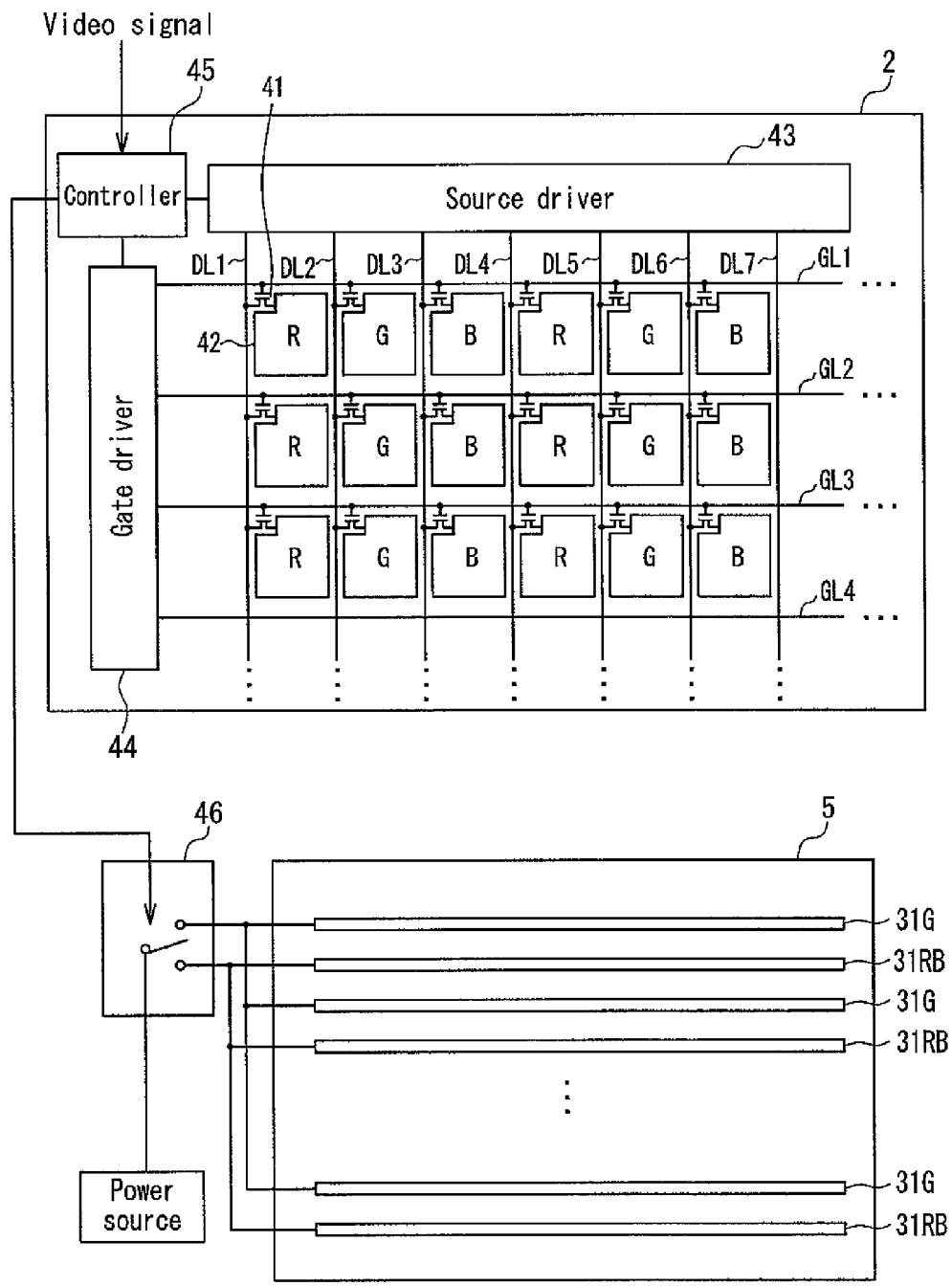
FIG. 4 is a block diagram showing a functional configuration of the liquid crystal display apparatus according to the first preferred embodiment of the present invention.

In the following, the configurations of the liquid crystal panel 2 and the backlight device 6 in the liquid crystal display apparatus 1 and methods of driving them will be described in more detail with reference to FIG. 4. FIG. 4 is a diagram schematically showing a functional relationship between the liquid crystal panel 2 and the backlight device 6 but is not intended to faithfully represent the physical sizes of the liquid crystal panel 2 and the backlight device 6.

As described above, the liquid crystal panel 2 is an active matrix type liquid crystal display element, and as shown in FIG. 4, it includes scanning lines GL and data lines DL that are arranged in a matrix form, a TFT 41 that is disposed at each of intersections of the scanning lines GL and the data lines DL, a pixel electrode 44 that is connected to a drain electrode of the TFT 41, a gate driver 44 that sequentially supplies a selection signal to the scanning lines GL, a source driver 43 that supplies a data signal to each of the data lines, and a controller 45 that supplies a clock signal, a timing signal and the like to the source driver 43, the gate driver 44 and the like.

Furthermore, the liquid crystal display apparatus 1 includes a switch circuit 46 that controls switching on/off of the cold cathode fluorescent tubes 31G and 31RB of the backlight device 6 in accordance with, for example, a timing signal supplied from the controller 25. The switch circuit 46 controls switching on/off of the cold cathode fluorescent tubes 31G and 31RB through ON/OFF of voltage supply from an alternating-current power source or the like to the cold cathode fluorescent tubes 31G and 31IRB. In this preferred embodiment, the switch circuit 46 is configured so that ON/OFF of all the plurality of the cold cathode fluorescent tubes 31G are controlled simultaneously, and ON/OFF of all the plurality of the cold cathode fluorescent tubes 31RB also are controlled simultaneously.

The configurations of the drivers and controller shown in FIG. 4 are merely illustrative, and modes of mounting these driving system circuits are arbitrary. For example, these driving system circuits may be arranged so that at least a portion of them is formed monolithically on an active matrix substrate, also may be mounted as semiconductor chips on a substrate, or alternatively, may be connected as external circuits of the active matrix substrate. Further, the switch circuit 46 may be provided on either of the liquid crystal panel 2 and the backlight device 6.

On an opposing substrate (not shown) opposed to this active matrix substrate, color filter layers of three colors of RGB are formed in stripes. In FIG. 4, the colors of color filters corresponding respectively to pixels are denoted by characters "R", "G", and "B". Thus, as shown in FIG. 4, all of pixels in one column connected commonly to each of the data lines DL display one of the colors of RGB. For example, in FIG. 4, all of pixels connected to the data line DL1 display red (R). Although the color filters described herein are in a stripe arrangement, other types of arrangements such as a delta arrangement and the like also may be adopted.

In the liquid crystal panel 2 configured as above, when a gate pulse (selection signal) having a predetermined voltage is applied sequentially to the scanning lines GL1, GL2, GL3, GL4, . . . , each of the TFTs 41 connected to one of the scanning lines GL, to which the gate pulse has just been applied, is brought to an ON state, and a value of a gradation voltage that has been applied to a corresponding one of the data lines DL at that point in time is written into the each of the TFTs 41. Consequently, a potential of the pixel electrode 42 connected to a drain electrode of the each of the TFTs 41 becomes equal to the value of the gradation voltage of the corresponding one of the data lines DL. As a result of this, an alignment of liquid crystals interposed between the pixel electrode 42 and an opposing electrode changes in accordance with the value of the gradation voltage, and thus a gradation display of the pixel is realized. On the other hand, during a time period in which a non-selective voltage is applied to the scanning lines GL, the TFTs 41 are brought to an OFF state, so that the potential of the pixel electrode 42 is maintained at a value of a potential applied thereto at the time of writing.

Figure 5:
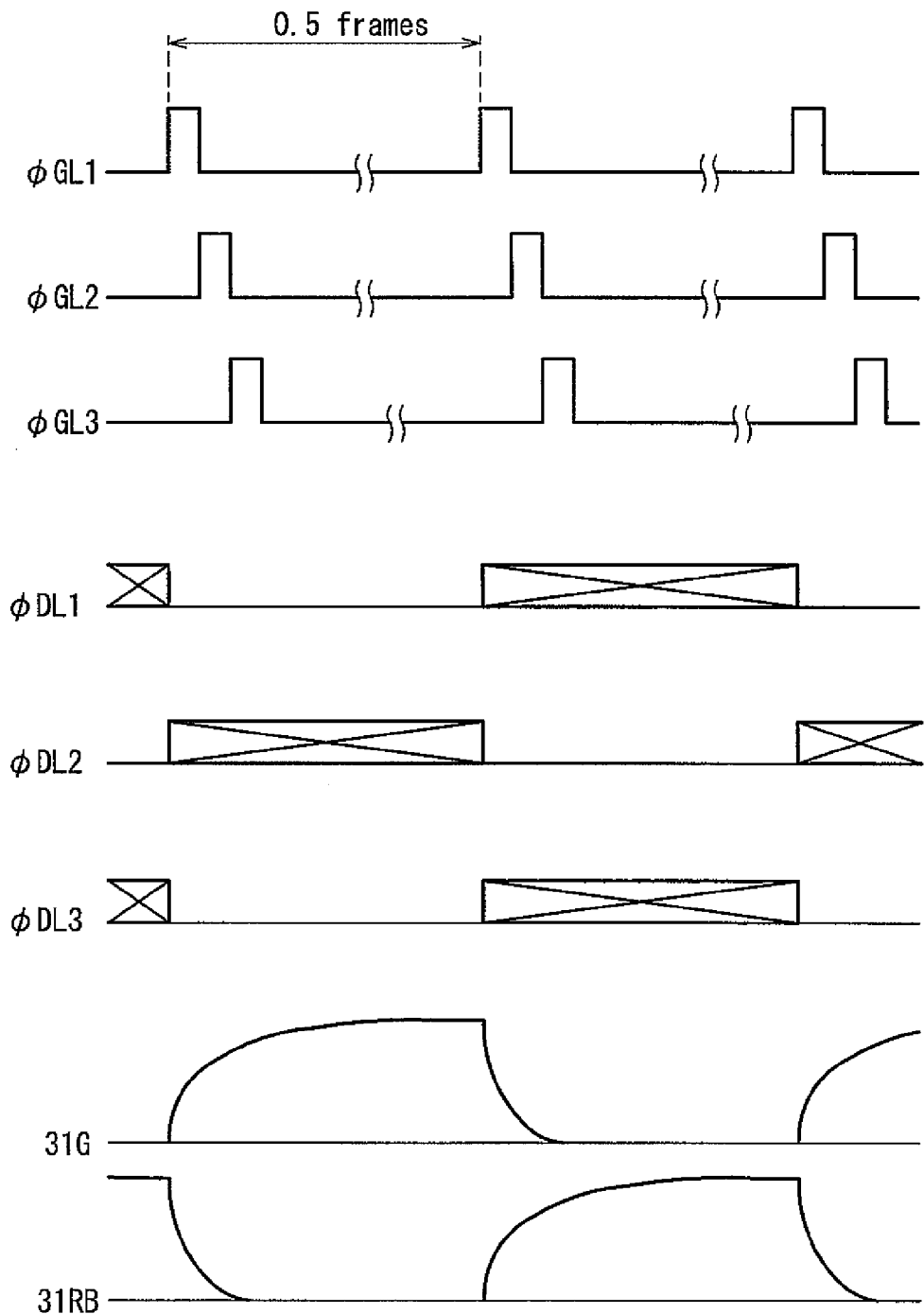
FIG. 5 is a timing chart showing one example of a relationship among timing for switching on/off light sources, timing for supplying a data signal to each of data lines, and amounts of light emitted by the light sources in the liquid crystal display apparatus according to the first preferred embodiment of the present invention.

In the liquid crystal display apparatus 1 according to this preferred embodiment, which is configured as above, as shown in FIG. 5, the gate driver 44 applies a gate pulse to each of the scanning lines GL at a cycle of ½ of a time period (one frame time period) in which one image is displayed in the liquid crystal panel 2. Then, at a first half of this one frame time period, the switch circuit 46 switches on the cold cathode fluorescent tubes 31G that emit green light while switching off the cold cathode fluorescent tubes 31RB. Further, at a latter half of one frame time period, the switch circuit 46 switches off the cold cathode fluorescent tubes 31G that emit green light while switching on the cold cathode fluorescent tubes 31RB. In FIG. 5, the first and second graphs from the bottom show amounts of light emitted by the cold cathode fluorescent tubes 31G and 31RB, respectively.

Furthermore, at the first half of one frame time period, the source driver 43 supplies a data signal to be applied to a green pixel to each of the data lines DL2, DL5, DL8, . . . that are connected to a group of pixel electrodes 42 among the pixel electrodes 42 that corresponds to the green color filter. Thus, at the first half of one frame time period, only a portion constituted of green pixels in one image is displayed.

Furthermore, at the latter half of one frame time period, the source driver 43 supplies a data signal to be applied to a red pixel to each of the data lines DL1, DL4, DL7, . . . that are connected to a group of pixel electrodes 42 among the pixel electrodes 42 that corresponds to the red color filter, and supplies a data signal to be applied to a blue pixel to each of the data lines DL3, DL6, DL9, . . . that are connected to a group of pixel electrodes 42 among the pixel electrodes 42 that corresponds to the blue color filter. Thus, at the latter half of one frame time period, only portions constituted of red pixels and blue pixels in one image are displayed.

For example, in the case where a data signal is a video signal according to the NTSC standards, the refreshing rate is 60 Hz and the length of one frame time period is 16.7 milliseconds. Therefore, in the case where at a first half of one frame time period, only a portion constituted of green pixels is displayed, and at a latter half thereof, portions constituted of red pixels and blue pixels are displayed as described above, due to a residual image effect, a resulting image is recognized to the human eye as an image of mixed colors of the three primary colors.

At the first half of one frame time period, during lighting of the cold cathode fluorescent tubes 31G that emit green light, a data signal supplied to each of the data lines DL1, DL4, DL7, . . . that are connected to the group of pixel electrodes 42 among the pixel electrodes 42 that corresponds to the red color filter and a data signal supplied to each of the data lines DL3, DL6, DL9, . . . that are connected to the group of pixel electrodes 42 among the pixel electrodes 42 that corresponds to the blue color filter may be maintained at a value of a potential applied in an immediately preceding frame or may have a predetermined potential value. However, it is preferable that these data signals have such a potential value as to cause a black gradation display. This is preferable because a black gradation display allows unwanted leakage light from a pixel portion to be blocked. The following describes reasons why leakage light as described above is generated.

Figure 6:
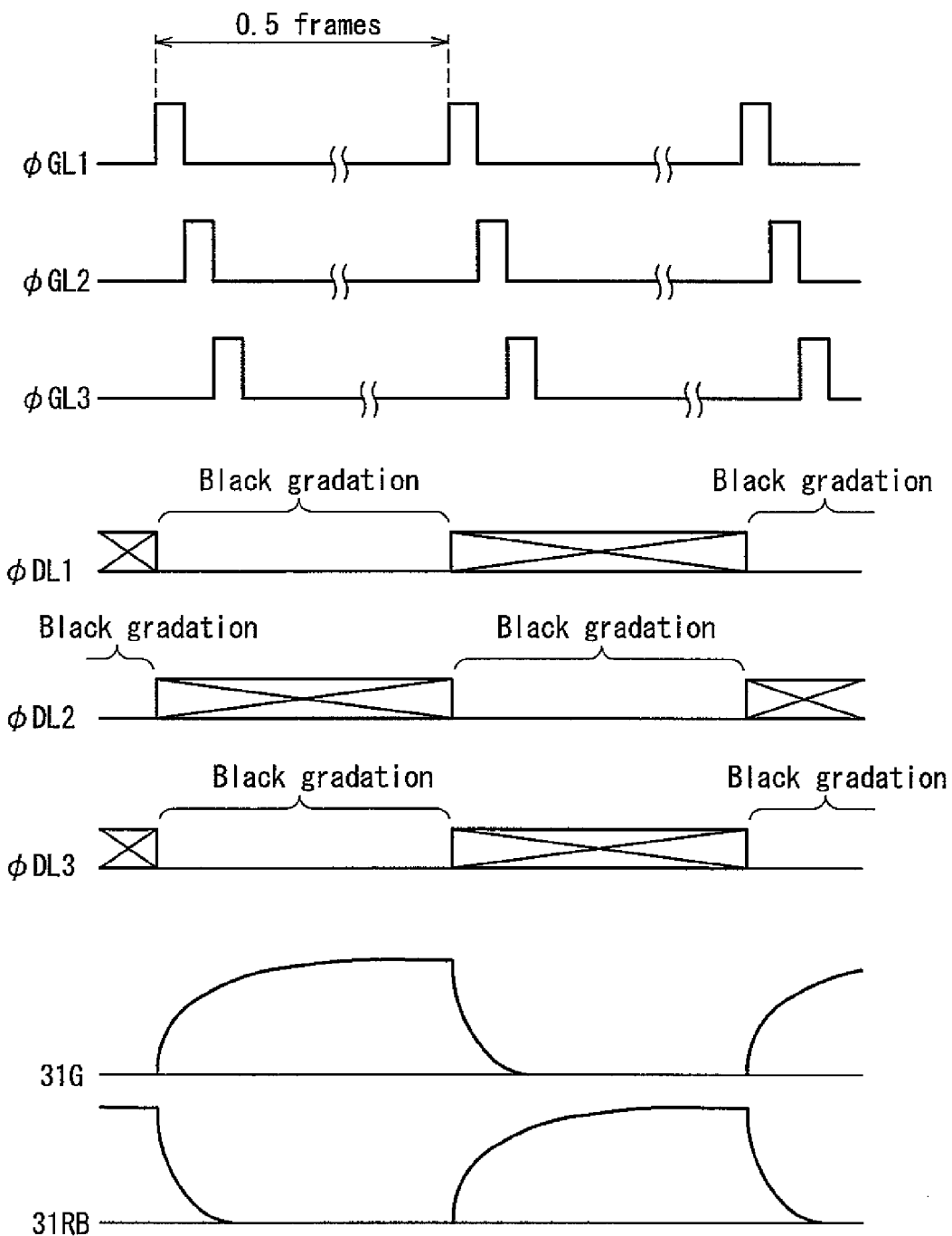
FIG. 6 is a timing chart showing another example of the relationship among timing for switching on/off the light sources, timing for supplying a data signal to each of the data lines, and amounts of light emitted by the light sources in the liquid crystal display apparatus according to the first preferred embodiment of the present invention.

One possible reason is that an ON/OFF signal of a drive circuit of the cold cathode fluorescent tubes is delayed or dull. That is, when the switch circuit 46 is controlled so that switching on/off is switched depending on whether the switching is performed at a first half or a latter half of one frame time period, if an ON/OFF signal is delayed or dull, there occurs a deviation of timing at which the cold cathode fluorescent tubes actually are switched ON/OFF. Because of this, for example, at an early stage of a first half of a frame, due to light from the cold cathode fluorescent tubes 31RB that are supposed to have been switched off, leakage light from the red and blue pixels may be generated, though in a small amount. Further, reasons other than the above-described reason include an ON/OFF delay of the cold cathode fluorescent tubes. Specifically, a cold cathode fluorescent tube has a characteristic that an amount of light emitted thereby does not immediately change in response to the control of switching on/off. For example, as shown in FIG. 6, when the switch circuit 46 is controlled so that switching on/off is switched depending on whether the switching is performed at a first half or a latter half of one frame time period, with respect to either of the cold cathode fluorescent tube 31G and the cold cathode fluorescent tube 31RB, which is being switched off, an amount of light emitted thereby does not become zero immediately after switching via the switch circuit 46. Because of this, for example, at an early stage of a first half of a frame, due to light from the cold cathode fluorescent tubes 31RB that are supposed to have been switched off, leakage light from the red and blue pixels may be generated, though in a small amount.

In such a case, as shown in FIG. 6, at a first half of one frame time period, a data signal having such a potential value as to cause a black gradation display is applied to each of the data lines DL1, DL4, DL7, . . . that are connected to the group of pixel electrodes 42 among the pixel electrodes 42 that corresponds to the red color filter and to each of the data lines DL3, DL6, DL9, . . . that are connected to the group of pixel electrodes 42 among the pixel electrodes 42 that corresponds to the blue color filter, and thus the generation of leakage light as described above can be prevented, thereby allowing further improved color purity to be obtained. For the same reason, it is preferable that, at a latter half of one frame time period, a data signal having such a potential value as to cause a black gradation display is supplied to each of the data lines DL2, DL5, DL8, . . . that are connected to the group of pixel electrodes 42 among the pixel electrodes 42 that corresponds to the green color filter.

Herein, the description is directed to an effect provided by the configuration according to this preferred embodiment in comparison with the conventional technique.

Figure 18A:
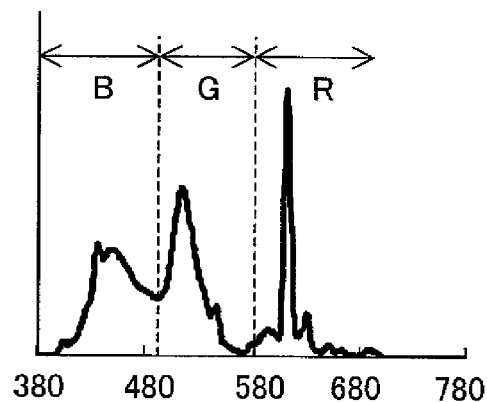
FIG. 18A is a spectrum diagram showing an emission spectrum of a three-wavelength tube.
Figure 18B:
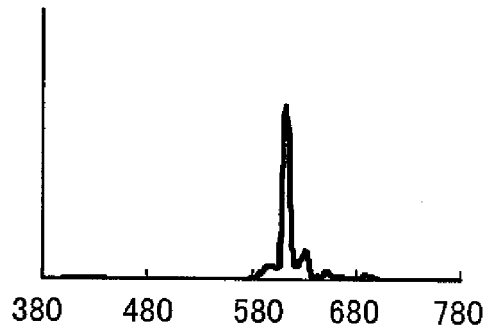
FIG. 18B is a spectrum diagram showing a spectral transmission characteristic of a red color filter in the case where this three-wavelength tube is used as a light source for a backlight.
Figure 18C:
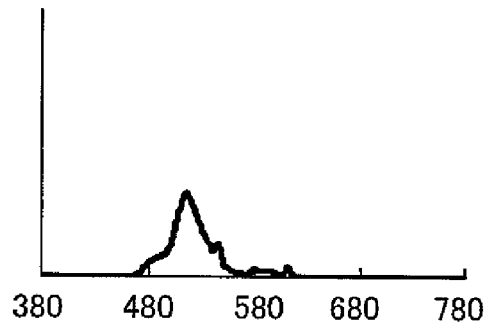
FIG. 18C is a spectral diagram showing a spectral transmission characteristic of a green color filter in the case where this three-wavelength tube is used as the light source for the backlight.
Figure 18D:
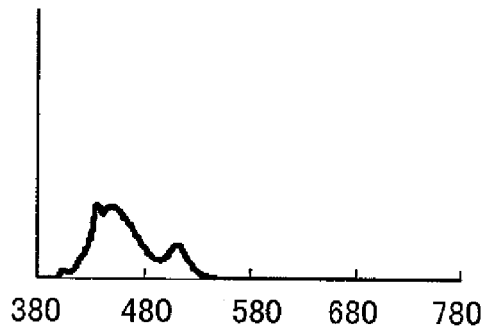
FIG. 18D is a spectrum diagram showing a spectral transmission characteristic of a blue color filter in the case where this three-wavelength tube is used as the light source for the backlight.

As shown in FIGS. 18C and 18D, the conventional configuration using a three-wavelength tube or a four-wavelength tube as a light source for a backlight has presented a problem that a blue component is mixed into a pixel that is to be displayed in green, and a green component is mixed into a pixel that is to be displayed in blue. This is caused by the fact that a spectral transmission curve of a blue color filter partially overlaps a wavelength band region of green and a spectral transmission curve of a green color filter partially overlaps a wavelength band region of blue. Particularly, the human eye has high sensitivity to a wavelength component of green, so that an adverse effect exerted on image quality when a green component is mixed into a blue pixel has been recognized to be considerable.

With respect to this problem, in the configuration according to this preferred embodiment, when displaying pixels corresponding to the blue color filter, only the cold cathode fluorescent tubes 31RB that do not have a wavelength component of green are switched on, and thus even though a spectral transmission curve of a blue color filter partially overlaps a wavelength band region of green, there is no possibility that an emission spectrum occurs in the wavelength region of green, thereby preventing the occurrence of color mixing. This achieves an improvement in color purity.

Figure 7A:
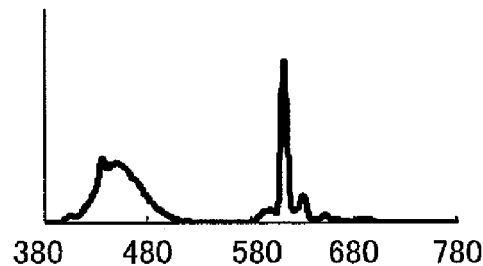
FIG. 7A is a spectrum diagram showing a spectral characteristic of a cold cathode fluorescent tube 31RB.
Figure 7B:
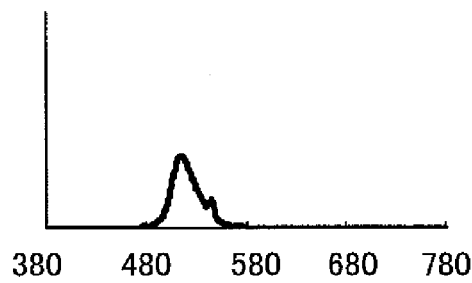
FIG. 7B is a spectrum diagram showing a spectral characteristic of a cold cathode fluorescent tube 31G.
Figure 7C:
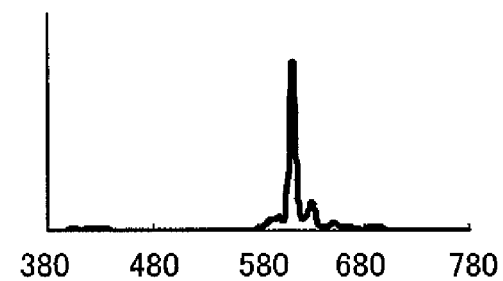
Figure 7D:
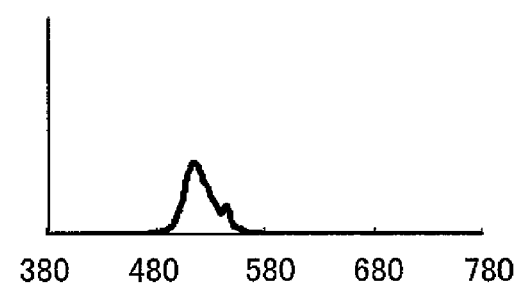
Figure 7E:
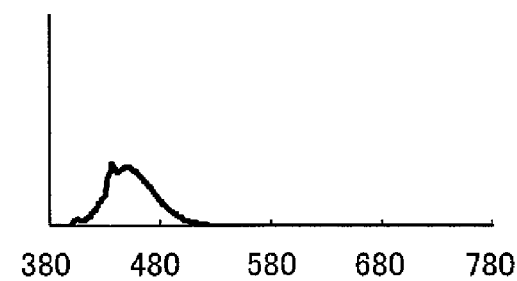

Particularly, by the above-described configuration in which the red and blue pixels are set so as to perform a black gradation display during a time period (first half of one frame) in which the green pixels are displayed and the green pixels are set so as to perform a black gradation display during a time period (latter half of one frame) in which the red and blue pixels are displayed, red, green, and blue can be separated completely without being mixed as shown in FIGS. 7C to 7E. FIG. 7A is a spectrum diagram showing a spectral characteristic of the cold cathode fluorescent tube 31RB, and FIG. 7B is a spectrum diagram showing a spectral characteristic of the cold cathode fluorescent tube 31G. FIG. 7C is a spectrum diagram showing a spectral characteristic of light that is transmitted through a pixel corresponding to the red color filter when the cold cathode fluorescent tubes 31RB are switched on. FIG. 7D is a spectrum diagram showing a spectral characteristic of light that is transmitted through a pixel corresponding to the green color filter when the cold cathode fluorescent tubes 31G are switched on. FIG. 7E is a spectrum diagram showing a spectral characteristic of light that is transmitted through a pixel corresponding to the blue color filter when the cold cathode fluorescent tubes 31RB are switched on.

Figure 8:
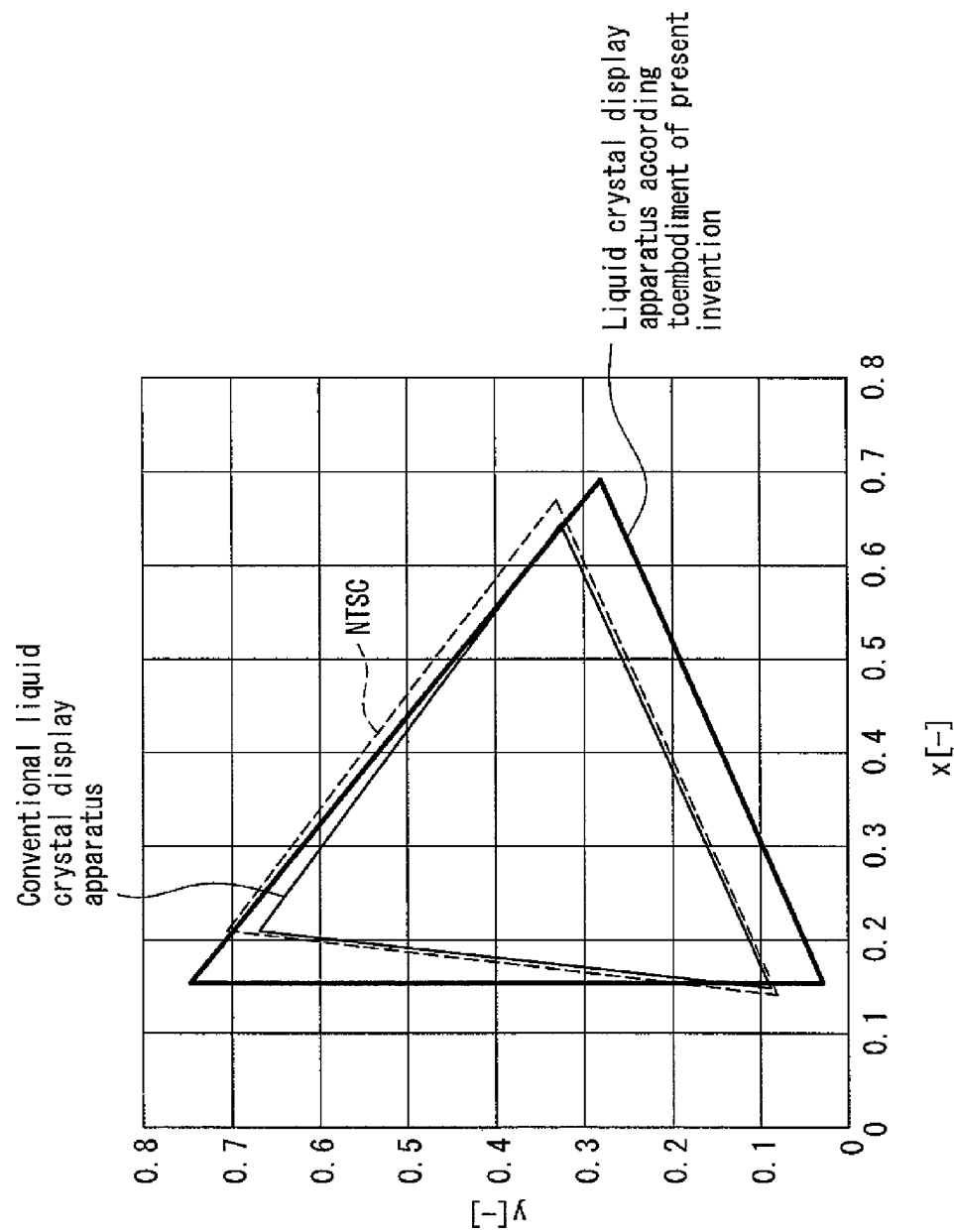
FIG. 8 is a chromaticity diagram (NTSC ratio) showing color reproduction ranges in the CIE 1931 color system of a conventional liquid crystal display apparatus using a three-wavelength tube as a light source for a backlight and the liquid crystal display apparatus according to a preferred embodiment of the present invention, respectively.

FIG. 8 is a chromaticity diagram (NTSC ratio) showing color reproduction ranges in the CIE 1931 color system of a conventional liquid crystal display apparatus using a three-wavelength tube as a light source for a backlight and the liquid crystal display apparatus according to this preferred embodiment. As the three-wavelength tube used as the light source for the backlight in the conventional liquid crystal display apparatus, a fluorescent tube was used in which a phosphor having an emission spectrum in a wavelength region of green (in the vicinity of 516 nm) (NP-108 manufactured by Nichia Corporation), a phosphor having an emission spectrum in a wavelength region of red (in the vicinity of 611 nm) (NP-340 manufactured by Nichia Corporation), and a phosphor having an emission spectrum in a wavelength region of blue (in the vicinity of 450 nm) (NP-107 manufactured by Nichia Corporation) were sealed.

As can be seen from FIG. 8, compared with the conventional liquid crystal display apparatus, the liquid crystal display apparatus according to this preferred embodiment exhibits highly improved color purity. As for a NTSC ratio, the conventional liquid crystal display apparatus had a ratio of 87.4%, whereas the liquid crystal display apparatus according to this preferred embodiment had a ratio of 121.3%.

As discussed in the foregoing description, according to the liquid crystal display apparatus of this preferred embodiment, compared with a conventional liquid crystal display apparatus using a three-wavelength tube or a four-wavelength tube as a light source for a backlight, improved color purity can be obtained. Further, although a supply of a gate pulse at a cycle of 0.5 frames increases a refreshing rate of a screen, since liquid crystals have a response speed that can conform to the refreshing rate at a frame rate of NTSC, PAL or the like, the liquid crystal display apparatus according to this preferred embodiment still can be realized sufficiently.

Second Preferred Embodiment

The following describes an illumination device and a liquid crystal display apparatus including the same according to a second preferred embodiment of the present invention. In the following description, configurations having functions similar to those of the configurations described in the first preferred embodiment are denoted by the same reference characters, and detailed descriptions thereof are omitted.

The liquid crystal display apparatus according to this preferred embodiment is different from the liquid crystal display apparatus according to the first preferred embodiment in that cold cathode fluorescent tubes 31G of a backlight device 6 are switched on successively in an order of arrangement so as to be synchronized with scanning of scanning lines in a liquid crystal panel 2, and so are cold cathode fluorescent tubes 31RB of the backlight device 6. In this preferred embodiment, in a similar manner to the first preferred embodiment, at a first half of one frame time period, a data signal is supplied to each in a group of data lines DL among data lines DL, which are connected to green pixels, and at a latter half of one frame time period, a data signal is supplied to each in a group of data lines DL among the data lines DL, which are connected to red pixels, and a data signal is supplied to each in a group of data lines DL among the data lines DL, which are connected to blue pixels.

Herein, the above-described expression "so as to be synchronized" means that in a 0.5 frame time period, the cold cathode fluorescent tubes 31G or the cold cathode fluorescent tubes 31RB are switched on sequentially from an upper side toward a lower side of a screen of the liquid crystal panel 2 so as to substantially track each one of scanning lines GL selected sequentially from the upper side toward the lower side of the screen of the liquid crystal panel 2, and does not necessarily require that timing for selecting the scanning lines GL be matched precisely with timing for switching on the cold cathode fluorescent tubes 31.

Figure 9:
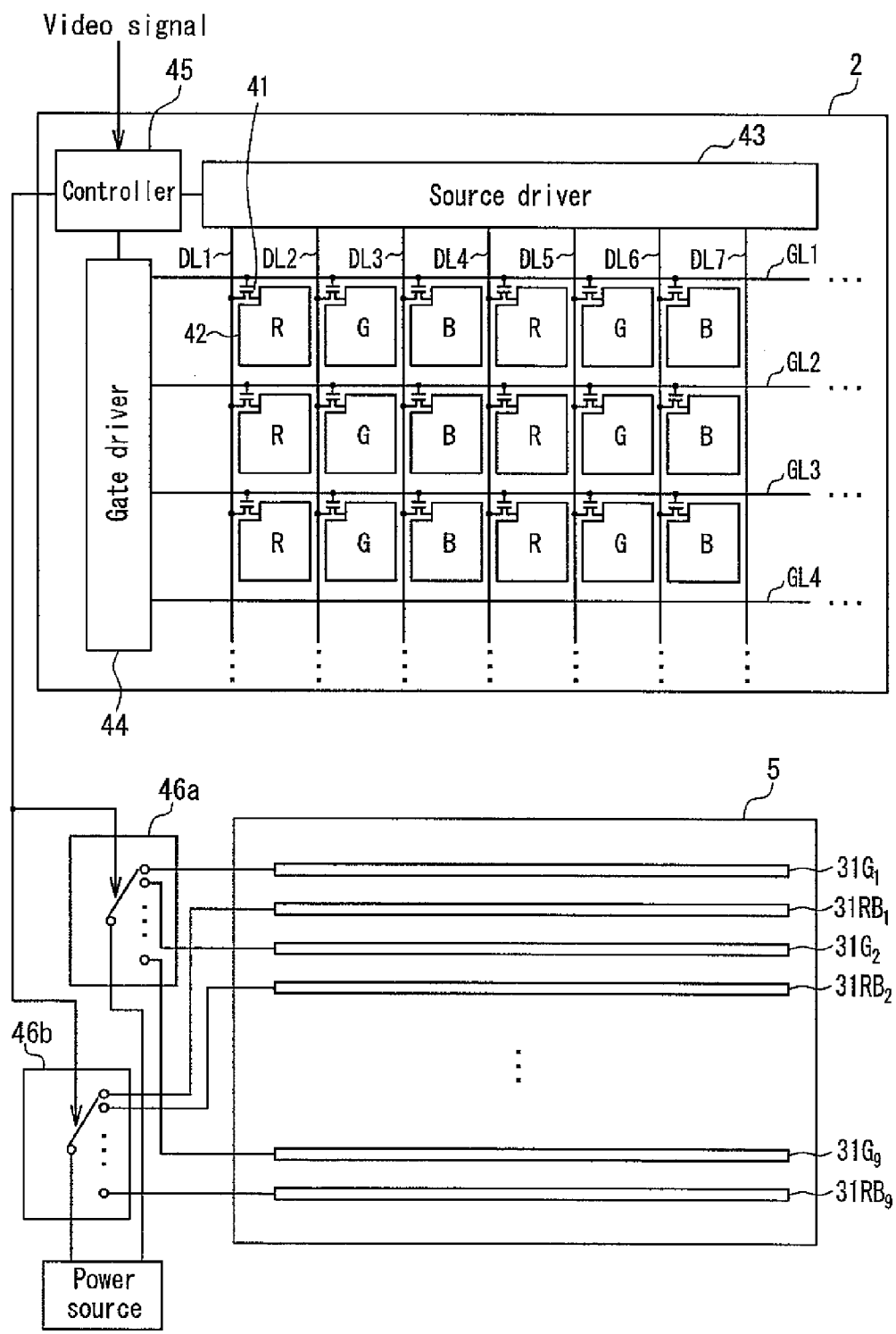
FIG. 9 is a block diagram showing a functional configuration of a liquid crystal display apparatus according to a second preferred embodiment of the present invention.

Therefore, as shown in FIG. 9, a liquid crystal display apparatus 20 according to this preferred embodiment includes, in place of the switch circuit 46 in the liquid crystal display apparatus 1 according to the first preferred embodiment, a switch circuit 46a that controls switching on/off of the cold cathode fluorescent tubes 31G and a switch circuit 46b that controls switching on/off of the cold cathode fluorescent tubes 31RB. In the following description, it is assumed that the liquid crystal display apparatus 20 includes 18 cold cathode fluorescent tubes in total composed of the cold cathode fluorescent tubes $31G_1$ to $31G_9$ and the cold cathode fluorescent tubes $31RB_1$ to $31RB_9$.

At a first half of one frame time period, the switch circuit 46a switches on the cold cathode fluorescent tubes $31G_1$ to $31G_9$ one by one in this order in accordance with, for example, a timing signal supplied from a controller 45 of the liquid crystal panel 2. That is, in a period of 0.5 frames, the cold cathode fluorescent tubes $31G_1$ to $31G_9$ are switched on one by one in order from the upper side toward the lower side of the screen of the liquid crystal panel 2 (from an upper side toward a lower side of FIG. 9). In a period of 0.5 frames, the scanning lines GL in the liquid crystal panel 2 are selected in order also in a direction from the upper side toward the lower side of the screen. Thus, at the first half of one frame time period, a position in the liquid crystal panel 2 that generally corresponds to one of the scanning lines GL to which a selection signal is being applied is irradiated with light from a corresponding one of the cold cathode fluorescent tubes 31G.

Furthermore, at a latter half of one frame time period, the switch circuit 46b switches on the cold cathode fluorescent tubes $31RB_1$ to $31RB_9$ one by one in this order in accordance with, for example, a timing signal supplied from the controller 45 of the liquid crystal panel 2. That is, in a period of 0.5 frames, the cold cathode fluorescent tubes 31 $RB_1$ to $31RB_9$ are switched on one by one in order from the upper side toward the lower side of the screen of the liquid crystal panel 2 (from the upper side toward the lower side of FIG. 7). In a period of 0.5 frames, the scanning lines GL in the liquid crystal panel 2 are selected in order also in the direction from the upper side toward the lower side of the screen. Thus, at the latter half of one frame time period, a position in the liquid crystal panel 2 that generally corresponds to one of the scanning lines GL to which a selection signal is being applied is irradiated with light from a corresponding one of the cold cathode fluorescent tubes 31RB.

Figure 10:
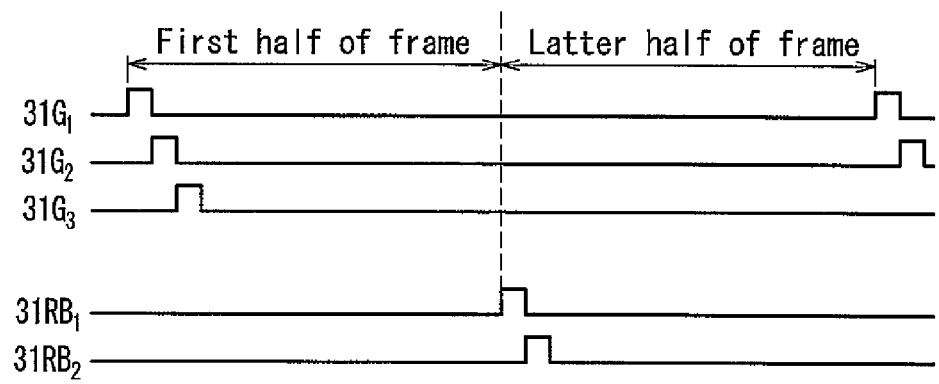
FIG. 10 is a timing chart showing one example of timing for switching on each cold cathode fluorescent tube in the liquid crystal display apparatus according to the second preferred embodiment of the present invention.

As a result of the above-described control performed by the switch circuits 46a and 46b, as shown in FIG. 10, in one frame time period, the cold cathode fluorescent tubes 31G and 31RB are switched on in an order of $31G_1$, $31G_2$, $31G_3$, ... $31G_9$, $31RB_1$, $31RB_2$, $31RB_3$, ... $31RB_9$. Even though a cold cathode fluorescent tube has a characteristic that an amount of light emitted thereby does not immediately change in response to the control of switching on/off as described above, in this preferred embodiment, there is no possibility that light is emitted simultaneously by any combination of one of the cold cathode fluorescent tubes 31G and one of the cold cathode fluorescent tubes 31RB that are positioned in close proximity to each other. For example, in the case of a combination of the cold cathode fluorescent tube $31G_1$ and the cold cathode fluorescent tube $31RB_1$ adjacent thereto, the cold cathode fluorescent tube $31RB_1$ is switched on after a lapse of about 0.5 frame time period from the time when the cold cathode fluorescent tube $31G_1$ is switched off. Thus, there is no possibility that light from the cold cathode fluorescent tube $31G_1$ is mixed into light from the cold cathode florescent tube $31RB_1$. This allows further improved color purity to be obtained.

Furthermore, similarly to the liquid crystal display apparatus 1 according to the first preferred embodiment, also in the liquid crystal display apparatus 20 according to this preferred embodiment, at a first half of one frame time period, during lighting of the cold cathode fluorescent tubes 31G that emit green light, a data signal supplied to each of the data lines DL1, DL4, DL7, ... that are connected to a group of pixel electrodes 42 among pixel electrodes 42 that corresponds to a red color filter and a data signal supplied to each of the data lines DL3, DL6, DL9, ... that are connected to a group of pixel electrodes 42 among the pixel electrodes 42 that corresponds to a blue color filter may be maintained at a value of a potential applied in an immediately preceding frame, may have a predetermined potential value, or alternatively, may have such a potential value as to cause a black gradation display.

Similarly, at a latter half of one frame time period, during lighting of the cold cathode fluorescent tubes 31RB, a data signal supplied to each of the data lines DL2, DL5, DL8, ... that are connected to a group of pixel electrodes 42 among the pixel electrodes 42 that corresponds to a green color filter may be maintained at a value of a potential applied in an immediately preceding frame, may have a predetermined potential value, or alternatively, may have such a potential value as to cause a black gradation display.

In the foregoing description, the cold cathode fluorescent tubes $31G_1$ to $31G_9$ and the cold cathode fluorescent tubes $31RB_1$ to $31RB_9$ are set so as to be switched on one by one sequentially at a first half and a latter half of one frame time period, respectively. However, as long as light is not emitted simultaneously by one of the cold cathode fluorescent tubes 31G and one of the cold cathode fluorescent tubes 31RB that are positioned in close proximity to each other, the effect of preventing the occurrence of color mixing can be obtained. From this viewpoint, the following configurations also are possible as modification examples.

Figure 11:
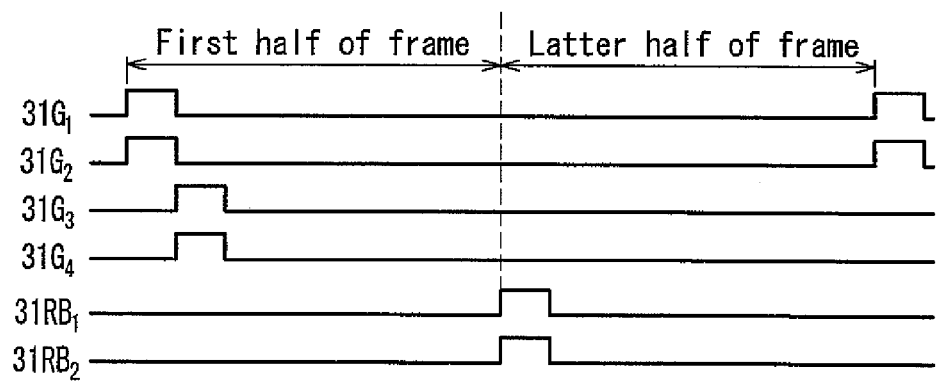
FIG. 11 is a timing chart showing another example of the timing for switching on each cold cathode fluorescent tube in the liquid crystal display apparatus according to the second preferred embodiment of the present invention.
Figure 12:
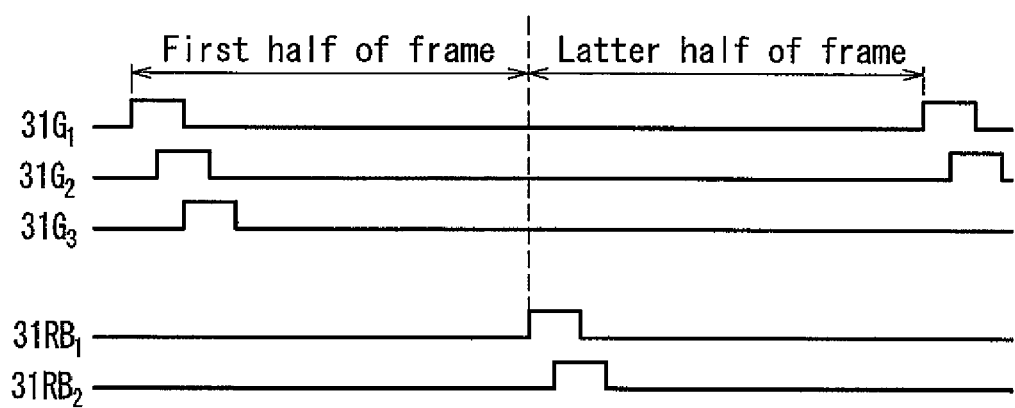
FIG. 12 is a timing chart showing still another example of the timing for switching on each cold cathode fluorescent tube in the liquid crystal display apparatus according to the second preferred embodiment of the present invention.

For example, the switch circuits 46a and 46b may be configured so that, as shown in FIG. 11, at a first half of one frame time period, the cold cathode fluorescent tubes $31G_1$ to $31G_9$ are switched on sequentially in sets of two or more adjacent ones as one set, and at a latter half of one frame time period, the cold cathode fluorescent tubes $31RB_1$ to $31RB_9$ also are driven to be switched on similarly to the above-described manner. Further, the switch circuits 46a and 46b also may be configured so that, as shown in FIG. 12, the cold cathode fluorescent tubes are switched on sequentially so that the respective periods of lighting time thereof overlap.

Third Preferred Embodiment

The following describes an illumination device and a liquid crystal display apparatus including the same according to a third preferred embodiment of the present invention. In the following description, configurations having functions similar to those of the configurations described in each of the above-described preferred embodiments are denoted by the same reference characters, and detailed descriptions thereof are omitted.

Figure 13:
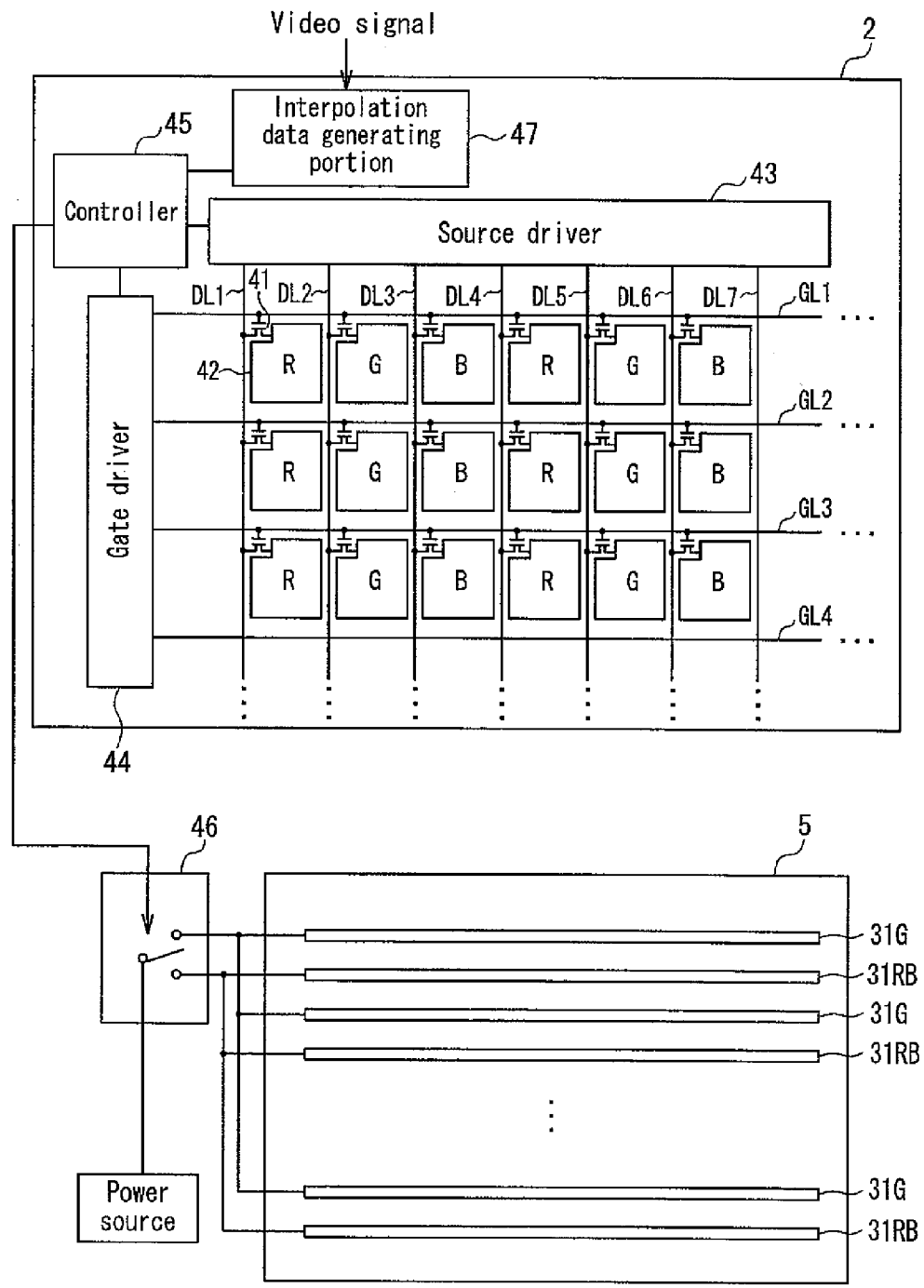
FIG. 13 is a block diagram showing a functional configuration of a liquid crystal display apparatus according to a third preferred embodiment of the present invention.

A liquid crystal display apparatus 30 according to this preferred embodiment is different from the first preferred embodiment in that, as shown in FIG. 13, it further includes an interpolation data generating portion 47 that generates a data signal to be supplied to one of data lines DL at a latter half of one frame time period by performing interpolation between a data signal to be supplied to the one of data lines DL in the frame time period and a data signal to be supplied to the one of data lines DL in a subsequent frame time period.

Similarly to the liquid crystal display apparatus 1 according to the first preferred embodiment, in the liquid crystal display apparatus 30 according to this preferred embodiment, at a first half of one frame time period, cold cathode fluorescent tubes 31G are switched on, while cold cathode fluorescent tubes 31RB are switched off, and at a latter half thereof, the cold cathode fluorescent tubes 31RB are switched on, while the cold cathode fluorescent tubes 31G are switched off.

Figure 14:
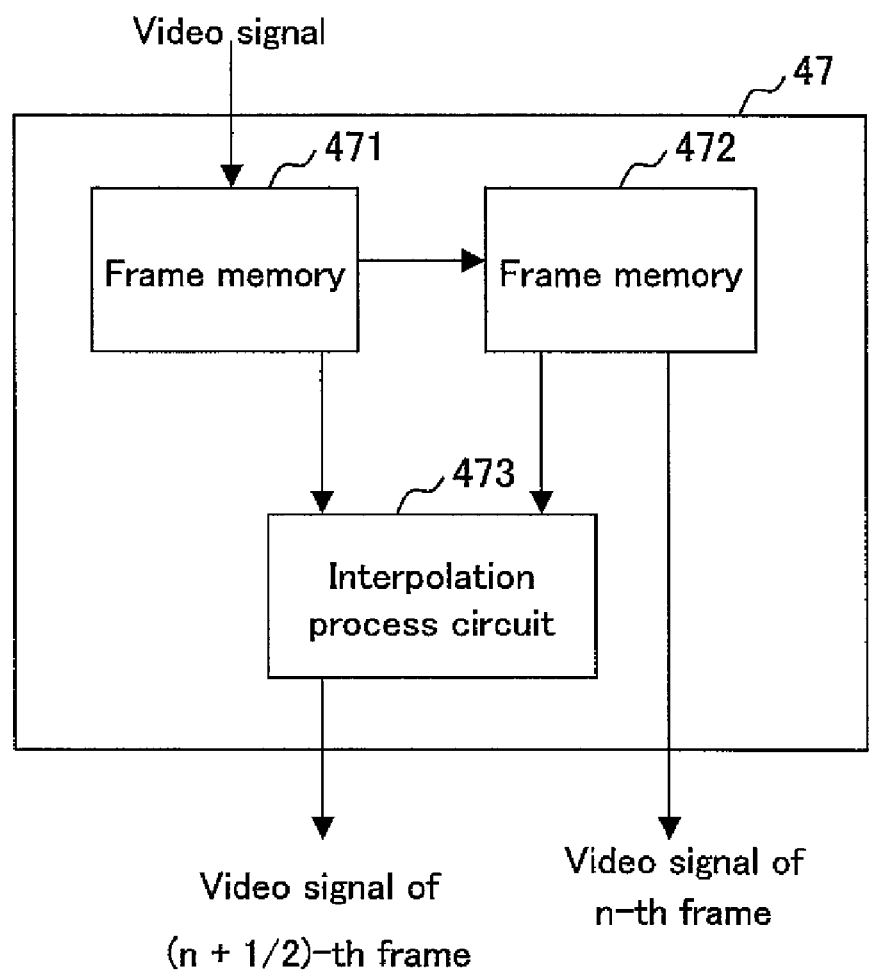
FIG. 14 is a block diagram showing an internal configuration of an interpolation data generating portion provided in the liquid crystal display apparatus according to the third preferred embodiment of the present invention.

FIG. 14 is a block diagram showing an internal configuration of the interpolation data generating portion 47. As shown in FIG. 14, the interpolation data generating portion 47 includes frame memories 471 and 472 and an interpolation process circuit 473. One frame of a video signal is stored in each of the frame memories 471 and 472.

In the case where a video signal of a n-th frame is stored in the frame memory 471, when a video signal of a succeeding (n+1)-th frame is newly inputted to the interpolation data generating portion 47, the video signal of the n-th frame that has been stored in the frame memory 471 is transferred to the frame memory 472 to be stored in the frame memory 472. After that, the above-described newly inputted video signal of the (n+1)-th frame is stored in the frame memory 471. Therefore, it follows that two frames of video signals in total are stored respectively in the frame memories 471 and 472.

The interpolation process circuit 473 reads out the video signal of the n-th frame and the video signal of the (n+1)-th frame and generates a video signal corresponding to a (n+½)-th frame by an interpolation process. In the interpolation process performed by the interpolation process circuit 473, various well-known interpolation algorithms can be used, though descriptions thereof are omitted herein.

The video signal corresponding to the (n+½)-th frame generated by the interpolation process circuit 473 and the video signal of the n-th frame stored in the frame memory 472 are supplied to a source driver 43 via a controller 45.

At a first half of the n-th frame, the source driver 43 supplies a data signal of a green component of the video signal of the n-th frame to each in a group of data lines DL among the data lines DL, which are connected to green pixels, and at a latter half of the n-th frame, the source driver 43 supplies a data signal of a red component of the video signal corresponding to the (n+½)-th frame generated by the interpolation process circuit 473 to each in a group of data lines DL among the data lines DL, which are connected to red pixels and supplies a data signal of a blue component of the same video signal corresponding to the (n+112)-th frame to each in a group of data lines DL among the data lines DL, which are connected to blue pixels.

According to the above-described configuration, particularly, in the case where a moving picture is displayed, the occurrence of a color breaking (referred to also as color breakup) phenomenon can be reduced, which is caused due to images of the primary colors being separated in chronological order when displayed.

FIG. 13 shows an exemplary configuration including, similarly to the liquid crystal display apparatus 1 according to the first preferred embodiment, a switch circuit 46 that, at a first half of one frame time period, switches on the cold cathode fluorescent tubes 31G while switching off the cold cathode fluorescent tubes 31RB, and at a latter half thereof, switches on the cold cathode fluorescent tubes 31RB while switches off the cold cathode fluorescent tubes 31G. However, a configuration also may be adopted in which in place of the switch circuit 46, the switch circuits 46*a* and 46*b* described in the second preferred embodiment are provided.

The configurations described in each of the above-described preferred embodiments are merely illustrative, and without limiting the technical scope of the present invention to the above-described specific examples, they can be modified variously.

For example, although each of the above-described preferred embodiments shows an example using a cold cathode fluorescent tube as a light source for a backlight, in place thereof, a hot cathode fluorescent tube also can be used. Further, phosphors presented specifically in the preferred embodiments are no more than illustrative.

Figure 15:
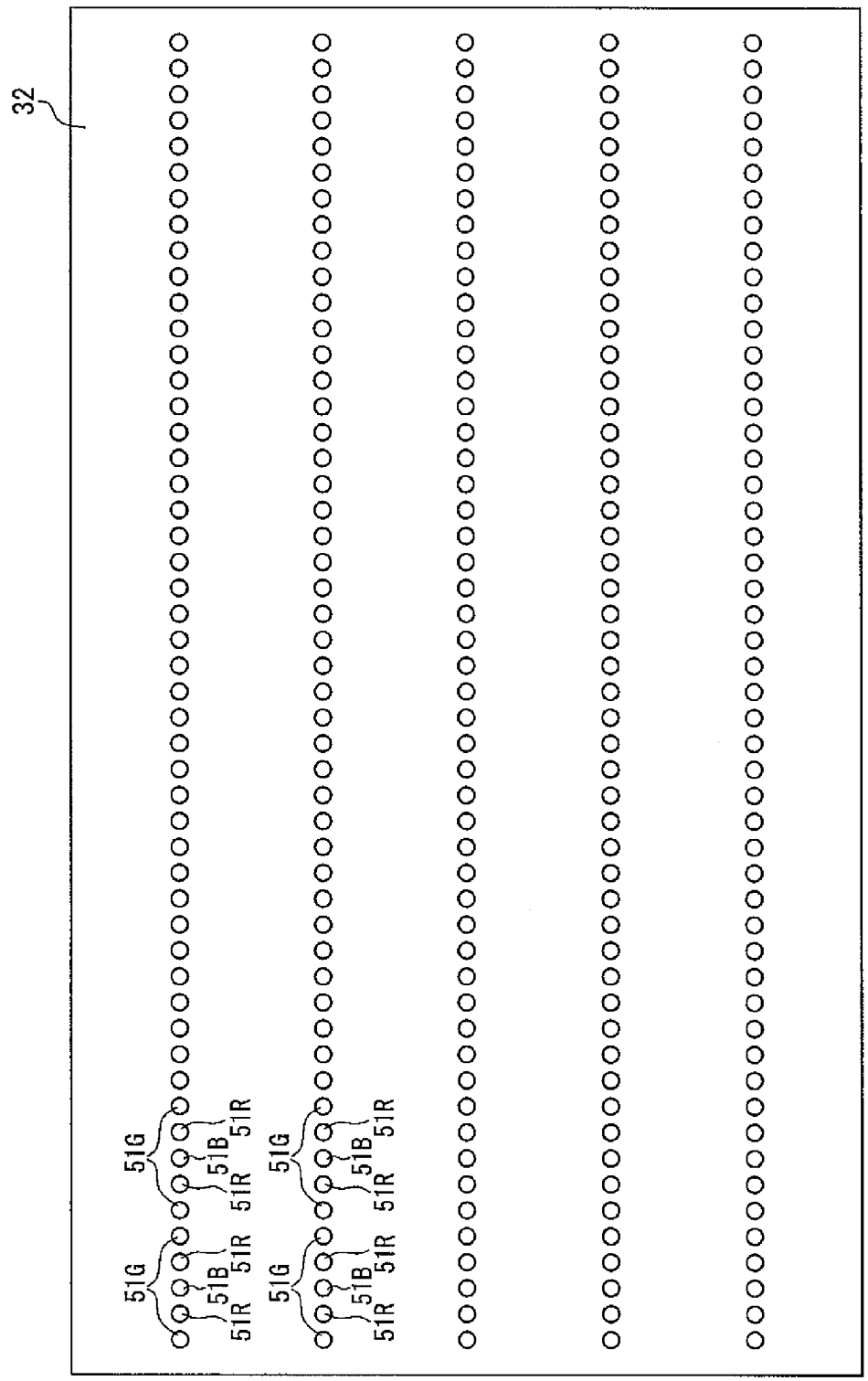
FIG. 15 is a plan view showing one example of an arrangement of LEDs used as light sources for a backlight in a liquid crystal display apparatus as a modification example of the first to third preferred embodiments of the present invention.
Figure 16:
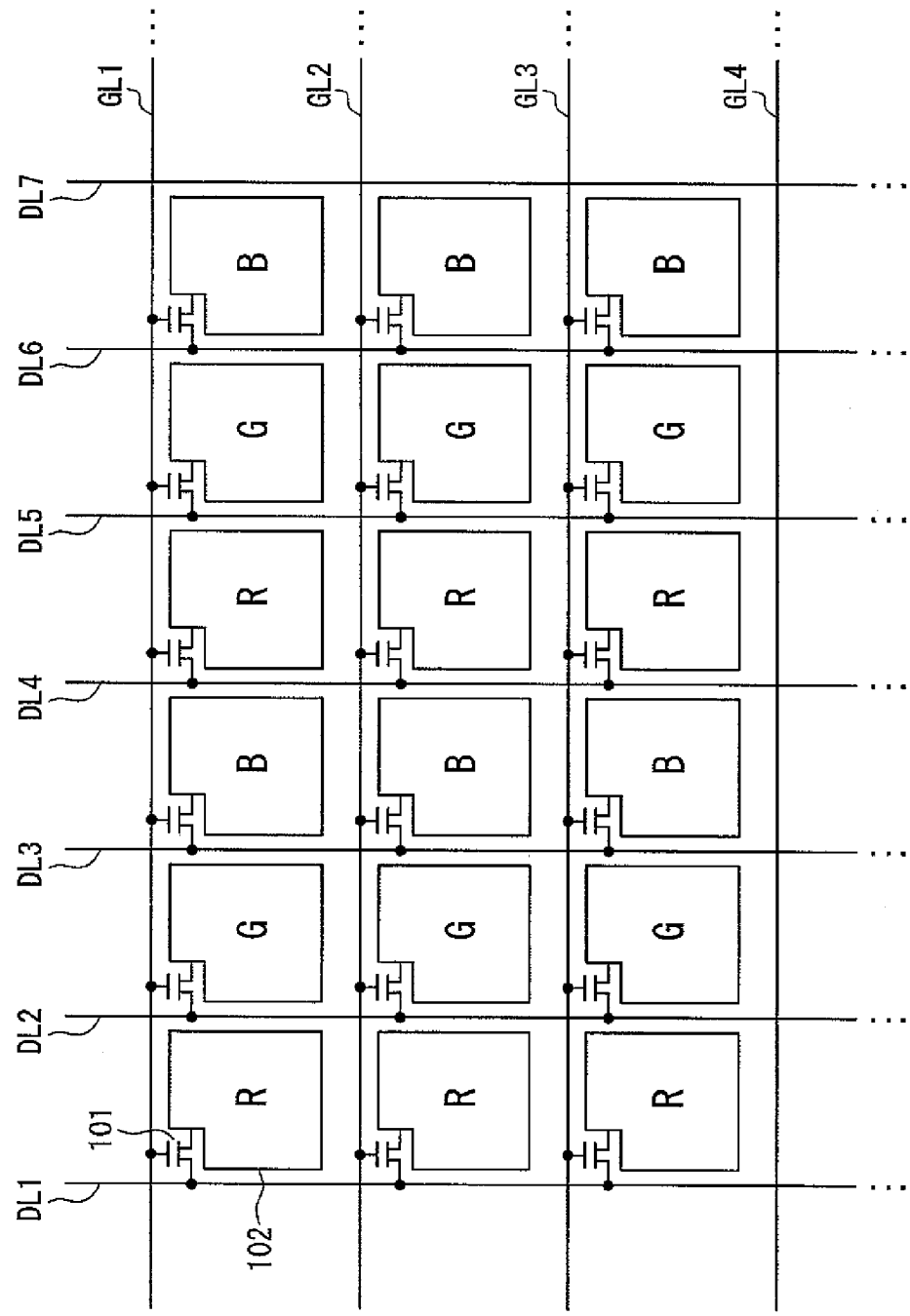
FIG. 16 is a schematic diagram showing a structure of an active matrix substrate in a conventional active matrix type liquid crystal display element, in which each pixel is shown with a color of color filters corresponding thereto.
Figure 17:
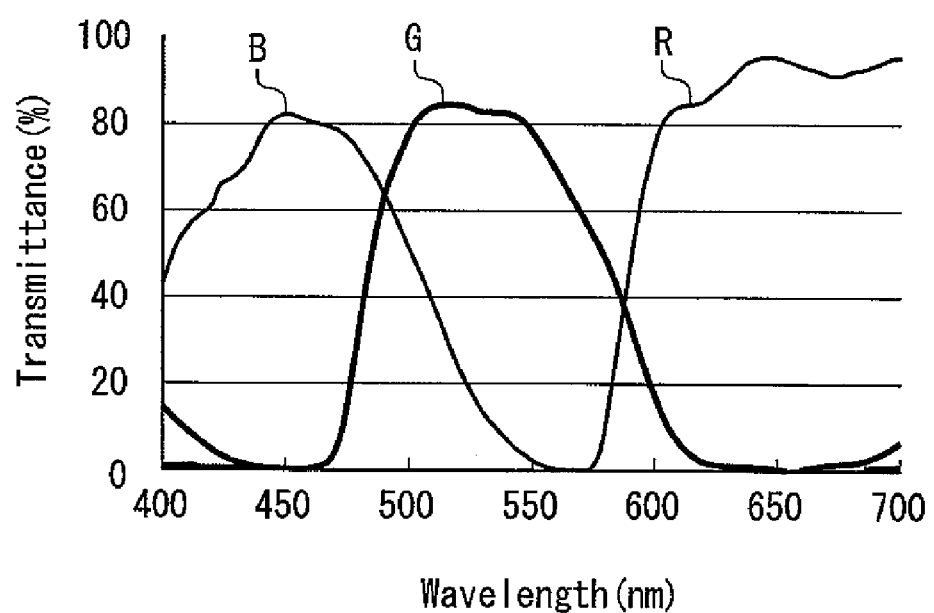
FIG. 17 is a spectrum diagram showing spectral transmission characteristics of color filters of three colors of RGB.

Moreover, it also is possible to use a LED as a light source for the backlight device 6. In that case, a configuration could be adopted in which, in place of the cold cathode fluorescent tubes 31, as shown in FIG. 15, LEDs 51R, 51G, and 51B of the respective colors of RGB are arranged in an orderly manner on a bottom surface of the case 32 of the backlight device 6 (see FIG. 3). This configuration could be such that, at a first half of one frame time period, only the green LEDs 51G are switched on, while the red LEDs 51R and the blue LEDs 51B are switched off, and at a latter half of one frame time period, the red LEDs 51R and the blue LEDs 51B are switched on, while the green LEDs 51G are switched off.

In the case where the LEDs of the respective colors are used as light sources for the backlight device 6 as shown in FIG. 15, it is preferable that, for example, in a liquid crystal display apparatus having a screen size of the 37V type, about 305 LEDs are used in total. In this case, the power consumption of the backlight device 6 would be about 246 W. Although FIG. 15 shows an example with a configuration in which the LEDs 51R, 51G, and 51B of the respective colors of RGB are arranged in an orderly manner in repeated sets of five LEDs composed of LEDs 51G, 51R, 51B, 51R, and 51G, the arrangement and number of the LEDs of the respective colors are not limited only to this example.

Furthermore, in the case of using LEDs in place of the cold cathode fluorescent tubes 31, a configuration may be adopted in which an LED 42 on which light-emitting elements of the respective colors of RGB are mounted as one package is disposed on the bottom surface of the case 32 of the backlight device 6 (see FIG. 3). Also in the LED 42, the light-emitting elements of the respective colors of RGB can be controlled so that the light-emitting elements of one color are switched on/off independently of the light-emitting elements of other colors, and therefore, this configuration could be such that, at a first half of one frame time period, only green light-emitting elements 42G are switched on, while red light-emitting elements 42R and blue light-emitting elements 42B are switched off, and at a latter half of one frame time period, the red light-emitting elements 42R and the blue light-emitting elements 42B are switched on, while the green light-emitting elements 42G are switched off. In the case of using the LED 42 having the above-described configuration as a light source for the backlight device 6, for example, in a liquid crystal display apparatus having a screen size of the 37V type, it is preferable to use about 1,950 LEDs are used in total. In this case, the power consumption of the backlight device 6 would be about 210 W.

Moreover, the backlight device 6 is not limited to a direct type backlight as described above and may be an edge-light type backlight in which a light source is disposed on a side surface of a light-guiding body.

Furthermore, although each of the above-described preferred embodiments shows an exemplary configuration including color filters of the three primary colors of RGB, the present invention also can be carried out using a configuration including color filters of three colors of CMY. Further, color filters applicable to the present invention are not limited to color filters of three colors, and the technical scope of the present invention encompasses a configuration including color filters of four or more colors including a color other than three colors that exhibit white when mixed (RGB or CMY). Further, although in each of the above-described preferred embodiments, at a first half of one frame time period, a portion constituted of green pixels in one image is displayed, and at a latter half thereof, portions constituted of red pixels and blue pixels are displayed. However, a configuration also may be adopted in which at a first half, portions constituted of red pixels and blue pixels in one image are displayed, and at a latter half, a portion constituted of green pixels is displayed.

Furthermore, each of the above-described preferred embodiments shows an exemplary configuration in which two types of light sources, i.e., a light source that emits light having a spectrum principally in a wavelength region of green and a light source of light having a spectrum principally in wavelength regions of red and blue are used as light sources for a backlight device. However, since deterioration in color purity is caused mainly by color mixing of green and blue, it is only required that a green component and a blue component be separated from each other. Thus, obviously, a configuration using two types of light sources that are a light source that emits light having a spectrum principally in a wavelength region of blue and a light source of light having a spectrum principally in wavelength regions of red and green also is suitable as a preferred embodiment of the present invention and provides an effect equivalent to the effect obtained by each of the above-described preferred embodiments. Further, in the case of using LEDs as light sources for a backlight device, a configuration may be adopted in which at one of a first half and a latter half of one frame time period, blue light-emitting diodes are caused to emit light, and at the other thereof, red light-emitting diodes and green light-emitting diodes are caused to emit light simultaneously, and an effect equivalent to the effect obtained by each of the above-described preferred embodiments is provided by this configuration.

The present invention is industrially useful as an illumination device used as a backlight of a display apparatus and a display apparatus including the same.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display apparatus, comprising:
a display element including:
scanning lines and data lines that are arranged in a matrix form;
a switching element that is connected to each of the scanning lines and a corresponding one of the data lines;
a pixel portion arranged to perform a gradation display in accordance with a data signal written from the corresponding one of the data lines when the switching element is brought to an ON state based on a signal of the each of the scanning lines; and
color filters that are arranged so as to correspond to the pixel portions and include at least filters of three colors that exhibit a white color when mixed;
an illumination device arranged to output plane-shaped light to the display element and includes a first light source that emits light of a first color that is one of the three colors and a second light source that emits light of a second color complementary to the first color, and in which a first scattering layer, a first light-condensing layer, a second scattering layer, and a second light-condensing layer are arranged sequentially from a side of a light source unit including the first light source and the second light source toward the display element so as to cover a light-radiating surface of the light source unit;
a scanning line driving portion arranged to sequentially supply a selection signal to each of the scanning lines at a cycle of half a time period in which one image is displayed in the display element;
a data line driving portion that, at one of a first half and a latter half of the time period in which one image is displayed in the display element, supplies a data signal to be written into each in a group of pixel portions among the pixel portions that corresponds to the color filter of the first color to a corresponding one of the data lines, and at an other of the first half and the latter half of the time period, supplies a data signal to be written into each in groups of pixel portions among the pixel portions that correspond respectively to the color filters of two colors among the three colors other than the first color to a corresponding one of the data lines; and a light source driving portion that, at the one of the first half and the latter half of the time period in which one image is displayed in the display element, switches on the first light source while switching off the second light source, and at the other of the first half and the latter half of the time period, switches on the second light source while switching off the first light source.

2. The display apparatus according to claim 1, wherein the first light-condensing layer and the second light-condensing layer include a lens sheet with a light output side surface on which a plurality of unit lenses are arranged.

3. The display apparatus according to claim 2, wherein the lens sheet has a lens portion in which a plurality of column-shaped lens structures are arranged in line in a direction that is perpendicular or substantially perpendicular to an axis of each of the lens structures in such a manner that the axis is parallel or substantially parallel to a sheet surface.

4. The display apparatus according to claim 3, wherein the lens sheet is a lenticular sheet having a lens portion in which a plurality of semi-columnar convex cylindrical lenses are arranged in line in a direction that is perpendicular or substantially perpendicular to an axis of each of the lenses in such a manner that the axis is parallel or substantially parallel to a sheet surface.

5. The display apparatus according to claim 3, wherein the first light-condensing layer and the second light-condensing layer are arranged such that arrangement directions of the lens structures disposed respectively on the light output side surfaces of the first light-condensing layer and the second light-condensing layer are perpendicular or substantially perpendicular to each other.

6. The display apparatus according to claim 1, wherein in the illumination device, as each of a combination of the first scattering layer and the first light-condensing layer and a combination of the second scattering layer and the second light-condensing layer, an optical sheet is used and is obtained by forming a lens sheet with a light output side surface on which a plurality of unit lenses are arranged and a light-scattering sheet into one body via an adhesive layer.

7. The display apparatus according to claim 6, wherein in the optical sheet, a light-reflecting layer is provided between the lens sheet and the light-scattering sheet, a surface of which on a side of the light-scattering sheet has high light reflectivity, and in the light-reflecting layer, an opening is formed in a portion corresponding to a portion of a flat surface of the lens sheet, onto which a perpendicular line from a vertex of a convex portion of each of the unit lenses is dropped, so as to correspond to the each of the unit lenses of the lens sheet.

8. The display apparatus according to claim 6, wherein the lens sheet has a lens portion in which a multitude of column-shaped lens structures are arranged in line in a direction that is perpendicular or substantially perpendicular to an axis of each of the lens structures in such a manner that the axis is parallel or substantially parallel to a sheet surface.

9. The display apparatus according to claim 8, wherein the lens sheet is a lenticular sheet having a lens portion in which a plurality of semi-columnar convex cylindrical lenses are arranged in line in a direction that is perpendicular or substantially perpendicular to an axis of each of the lenses in such a manner that the axis is parallel or substantially parallel to a sheet surface.

10. The display apparatus according to claim 8, wherein a first optical sheet that is the optical sheet as the combination of the first scattering layer and the first light-condensing layer and a second optical sheet that is the optical sheet as the combination of the second scattering layer and the second light-condensing layer are disposed in such a manner that arrangement directions of the lens structures disposed respectively on light output side surfaces of the first optical sheet and the second optical sheet are perpendicular or substantially perpendicular to each other.

11. The display apparatus according to claim 1, wherein at one of the first half and the latter half of the time period in which one image is displayed in the display element, the data line driving portion supplies a data signal for causing each in the groups of pixel portions among the pixel portions that correspond respectively to the color filters of two colors among the three colors other than the first color to perform a black gradation display to a corresponding one of the data lines, and at an other of the first half and the latter half of the time period in which one image is displayed in the display element, the data line driving portion supplies a data signal for causing each in the group of pixel portions among the pixel portions that corresponds to the color filter of the first color to perform a black gradation display to a corresponding one of the data lines.

12. The display apparatus according to claim 1, wherein in the illumination device, a plurality of the first light sources and a plurality of the second light sources are arranged in a direction perpendicular or substantially perpendicular to the scanning lines, and at one of the first half and the latter half of the time period in which one image is displayed in the display element, the light source driving portion switches on the plurality of the first light sources successively in an order of arrangement so as to be synchronized with an application of the selection signal to each of the scanning lines, and at an other of the first half and the latter half of the time period in which one image is displayed in the display element, the light source driving portion switches on the plurality of the second light sources successively in an order of arrangement so as to be synchronized with the application of the selection signal to each of the scanning lines.

13. The display apparatus according to claim 1, further comprising an interpolation data generating portion arranged to generate a data signal to be supplied to one of the data lines at the latter half of the time period in which one image is displayed in the display element by performing interpolation between a data signal to be supplied to the one of the data lines in the time period and a data signal to be supplied to the one of the data lines in a subsequent time period.

14. The display apparatus according to claim 1, wherein the light of the first color has a spectrum principally in a wavelength region of green, and the light of the second color has a spectrum principally in wavelength regions of red and blue.

15. The display apparatus according to claim 1, wherein the light of the first color has a spectrum principally in a wavelength region of blue, and the light of the second color has a spectrum principally in wavelength regions of red and green.

16. The display apparatus according to claim 1, wherein each of the first light source and the second light source is a cold cathode fluorescent tube or a hot cathode fluorescent tube.

17. The display apparatus according to claim 16, wherein a plurality of the first light sources and a plurality of the second light sources are provided and arranged so as to alternate with each other one by one or in sets of a plural number of the first or second light sources.

18. The display apparatus according to claim 1, wherein the first light source is a green light-emitting diode, and the second light source is formed of a combination of a red light-emitting diode and a blue light-emitting diode that emits light at a same time that the red light-emitting diode emits light.

19. The display apparatus according to claim 1, wherein the first light source is a blue light-emitting diode, and the second light source is formed of a combination of a red light-emitting diode and a green light-emitting diode that emits light at a same time that the red light-emitting diode emits light.

\* \* \* \* \*